United States Patent
Kondrashkin et al.

(10) Patent No.: US 11,822,447 B2
(45) Date of Patent: Nov. 21, 2023

(54) METHODS AND SERVERS FOR STORING DATA ASSOCIATED WITH USERS AND DIGITAL ITEMS OF A RECOMMENDATION SYSTEM

(71) Applicant: YANDEX EUROPE AG, Lucerne (CH)

(72) Inventors: Dmitry Andreevich Kondrashkin, Moscow (RU); Zurab Otarievich Svianadze, g Mytishchi (RU); Dmitry Valerevich Ushanov, Moscow (RU)

(73) Assignee: Direct Cursus Technology L.L.C, Dubai (AE)

( * ) Notice: Subject to any disclaimer, the term of this patent is extended or adjusted under 35 U.S.C. 154(b) by 380 days.

(21) Appl. No.: 17/317,978

(22) Filed: May 12, 2021

(65) Prior Publication Data
US 2022/0107872 A1    Apr. 7, 2022

(30) Foreign Application Priority Data

Oct. 6, 2020    (RU) ............................... 2020132860

(51) Int. Cl.
*G06F 11/30*    (2006.01)
*G06N 5/04*    (2023.01)
(Continued)

(52) U.S. Cl.
CPC ...... *G06F 11/3034* (2013.01); *G06F 18/2113* (2023.01); *G06F 18/2133* (2023.01);
(Continued)

(58) Field of Classification Search
None
See application file for complete search history.

(56) References Cited

U.S. PATENT DOCUMENTS 9,348,924 B2    5/2016    Somekh et al.
9,411,974 B2    8/2016    Digirolamo et al.
(Continued)

FOREIGN PATENT DOCUMENTS

CN    105894310 A    8/2016
CN    106897265 A    6/2017
(Continued)

OTHER PUBLICATIONS

CatBoost, https://catboost.ai accessed on Apr. 15, 2021, pdf 5 pages.
(Continued)

*Primary Examiner* — Henry Tsai
*Assistant Examiner* — Harry Z Wang
(74) *Attorney, Agent, or Firm* — BCF LLP

(57) ABSTRACT

Methods and servers for storing data associated with users and digital items of a recommendation system having access to non-distributed and distributed storages. The server trains a model based for generating first user and item embeddings. The server stores (i) the first user embeddings in the non-distributed storage, and (ii) the first item embeddings in the distributed storage. The server re-trains the model for generating second user and item embeddings. The server stores (i) the second user embeddings in the non-distributed storage in addition to the first user embeddings, and (ii) second item embeddings in the distributed storage instead of the respective first item embeddings by replacing the respective first item embeddings. When the second item embeddings are stored on each node of the distributed storage, the server removes the first user embeddings associated with the first value from the non-distributed storage.

20 Claims, 10 Drawing Sheets

(51) Int. Cl.
　　　*G06N 20/00*　　　(2019.01)
　　　*G06F 18/2113*　　(2023.01)
　　　*G06F 18/2133*　　(2023.01)
　　　*G06F 18/2135*　　(2023.01)
(52) U.S. Cl.
　　　CPC ......... *G06F 18/21355* (2023.01); *G06N 5/04* (2013.01); *G06N 20/00* (2019.01)

(56) References Cited

U.S. PATENT DOCUMENTS

| | | | |
|---|---|---|---|
| 10,394,420 | B2 | 8/2019 | Esinovskaya et al. |
| 10,503,827 | B2 | 12/2019 | Kurata et al. |
| 2007/0118521 | A1 | 5/2007 | Jatowt et al. |
| 2007/0220034 | A1 | 9/2007 | Iyer et al. |
| 2014/0365456 | A1* | 12/2014 | Lee .................. G06F 16/335 707/706 |
| 2015/0169772 | A1 | 6/2015 | Alonso et al. |
| 2016/0275416 | A1* | 9/2016 | Min .................. G06F 17/16 |
| 2018/0075137 | A1 | 5/2018 | Lifar et al. |
| 2018/0218428 | A1* | 8/2018 | Xie .................. G06Q 10/067 |
| 2019/0164084 | A1 | 5/2019 | Gulin |
| 2019/0272472 | A1 | 9/2019 | Chen et al. |
| 2019/0392315 | A1 | 12/2019 | Tam et al. |
| 2019/0392816 | A1 | 12/2019 | Kim et al. |
| 2020/0134374 | A1 | 4/2020 | Oros |
| 2020/0250191 | A1* | 8/2020 | Cappiello .............. G06F 16/254 |
| 2021/0126885 | A1* | 4/2021 | Zhang .................. H04L 51/226 |
| 2021/0271723 | A1* | 9/2021 | Miranda .............. H04L 67/025 |

FOREIGN PATENT DOCUMENTS

| | | |
|---|---|---|
| CN | 109635116 A | 4/2019 |
| CN | 110275881 A | 9/2019 |
| CN | 110298031 A | 10/2019 |
| CN | 110956278 A | 4/2020 |
| JP | 2013105215 A | 5/2013 |
| WO | 2019128547 A1 | 7/2019 |

OTHER PUBLICATIONS

English Abstract for CN110298031 retrieved on Espacenet on May 10, 2021.
English Abstract for CN 105894310 retrieved on Espacenet on May 10, 2021.
English Abstract for CN110956278 retrieved on Espacenet on May 10, 2021.
English Abstract for JP2013105215 retrieved on Espacenet on May 10, 2021.
English Abstract for CN106897265 retrieved on Espacenet on May 10, 2021.
English Abstract for CN110275881 retrieved on Espacenet on May 10, 2021.
English Abstract for CN 109635116 retrieved on Espacenet on May 10, 2021.

* cited by examiner

METHODS AND SERVERS FOR STORING DATA ASSOCIATED WITH USERS AND DIGITAL ITEMS OF A RECOMMENDATION SYSTEM

CROSS-REFERENCE

The present application claims priority to Russian Patent Application No. 2020132860, filed on Oct. 6, 2020, the entirety of which is incorporated herein by reference.

FIELD

The present technology relates to computer-implemented recommendation systems in general and specifically to methods and systems for storing data associated with users and digital items of a recommendation system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Spain (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various sources, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Another example of the recommendation system is YANDEX.ZEN™ recommendation system. The Yandex.Zen recommendation system recommends digital content (such as articles, news, and video in a personalized feed on the Yandex.Browser start screen). As the user browses the Yandex.Zen server recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

It has been appreciated by the developers of the present technology that selection of relevant digital content for users of a recommendation service requires a significant amount of processing power during online operation (i.e. when a content recommendation request is received from a given user of the recommendation service). State of the art relevance estimation models may be employed for processing a large amount of digital content in an online mode for determining which digital content should be provided to given users of the recommendation service. However, the execution of these state of the art relevance estimation models is computationally expensive due to a large amount and variety of factors that are needed to be taken into account for estimating relevance of digital content, and results in an important processing power requirement on the recommendation system in online operation.

It should be noted that in the context of the present technology, the relevance estimation model is implemented as a Machine Learning Algorithm (MLA) configured to estimate relevance of digital items to a given user. Just as an example, the relevance estimation model can be a decision-tree based model implemented in accordance with the CatBoost framework. Additional information regarding the CatBoost library and gradient boosting algorithms used for building such models is available at https://catboost.ai.

As previously alluded to, the relevance estimation model is configured to use a variety of features associated with a given user-item pair for estimating relevance of the digital item in that pair to the user in that pair. One of these features is generated based on a combination of an "item embedding" and a "user embedding". Broadly speaking, an embedding is a vector representing certain information about a digital item (if item embedding) or a user (if user embedding). The user embedding is generated based on interactions of a respective user with digital content of the recommendation system. The item embedding is generated based on interactions of a plurality of users of the recommendation system with a respective digital item. One of the features used by the relevance estimation model for estimating the relevance of a given digital item to a given user can be a scalar product, for example, between the respective item embedding and the respective user embedding.

It should also be noted that a variety of techniques can be used for generating item and user embeddings. In at least some embodiments of the present technology, the item and user embeddings may be generated by a matrix factorization model. Broadly speaking, a given matrix factorization model is configured to factorize a matrix containing user-item interaction data between users and digital items (that has been collected by the recommendation system) into (i) a digital item matrix representative of a plurality of item embeddings and (ii) a user matrix representative of a plurality of user embeddings. For example, matrix factorization models configured to determine user and item embeddings based on a matrix of user-item interactions are used by recommendation systems for performing collaborative filtering. In at least some embodiments of the present technology, it is contemplated that the matrix factorization model may be a given Singular Value Decomposition based (SVD-based) model configured to decompose the user-item interaction matrix into the user matrix (user embeddings) and the digital item matrix (item embeddings).

It should also be appreciated that user-item interaction data is "sparse". Indeed, a given user typically does not interact with all digital items of the recommendation service and, therefore, user-item interaction data is generally not available for each and every user-item pair of the recommendation system. As such, a given matrix factorization model is trained based on currently available user-item interaction data to predict missing user-item interaction data and, then, is configured to generate the user and item embeddings as explained above. Once the item and user embeddings are so-generated, they are used by the relevance estimation model for estimating relevance of digital items to users.

Additionally, it should be noted that new digital items are continuously added to the recommendation pool, while other digital items may be removed from the recommendation pool over time. Furthermore, as the recommendation system provides content recommendations to its users, additional user-item interaction data is being collected over time. As a result, it is advantageous to periodically re-train the matrix factorization model on the most recently available user-item interaction data since (i) it can include user-item interaction data for items that are new to the recommendation pool, and (ii) it may include more user-item interaction data than user-item interaction data having been available during a previous training phase of the matrix factorization model. In other words, it is beneficial to, in a sense, periodically "update" the matrix factorization model based on most recently available information about user-item interactions for making better predictions.

After each update, the matrix factorization model is configured to generate a respective "version" of the user and item embeddings. For example, the matrix factorization model may be configured to:
(i) after a first given update/training phase, generate a first version of the user embeddings (first version of the user matrix) and a first version of the item embeddings (first version of the digital item matrix); and
(ii) after a second given update/training phase, generate a second version of the user embeddings (second version of the user matrix) and a second version of the item embeddings (second version of digital item matrix).

Developers of the present technology have realized that when the system is generating a feature for the relevance estimation model in an online mode as a combination of a user and item embedding, it is important to make sure that the item embedding and the user embedding in that combination are of a same version. In other words, it is undesirable to generate a feature as a combination of an item embedding from a given version and a user embedding from another, different, version. However, ensuring that item and user embeddings of a same version are retrieved from memory for generating a feature to be used by the relevance estimation model in an online mode is a difficult task.

Many recommendation systems are configured to employ distributed storages for storing data. Broadly speaking, a distributed storage is a computer network where information is stored on more than one "node", often in a replicated fashion. Distributed storages offer different advantages at different architectural layers (e.g., physical layer, network layer, etc.) for increasing fault-tolerance and/or load balancing, for example.

It should be noted that the number of users of a recommendation system may be a lot larger than the number of items that the recommendation system can potentially provide to users as recommended content. This results in that the number of user embeddings to be stored following an update is a lot larger than the number of item embeddings to be stored following an update. In at least some embodiments of the present technology, it is contemplated that storing user embeddings following an update make require a lot more time than storing item embeddings following an update. In some cases, the difference in duration of a storing process of user embeddings of a given version and a storing process of item embeddings of the given version may make it difficult to ensure that item and user embeddings of a same version are retrieved from memory for generating a feature to be used by the relevance estimation model in an online mode. Developers of the present technology have devised methods and systems for overcoming at least some drawbacks of the prior art. In at least some embodiments of the present technology, the recommendation system is configured to store user embeddings in a non-distributed storage and item embeddings in a distributed storage.

In a first broad aspect of the present technology, there is provided a method of storing data associated with users of a recommendation system and digital items recommendable in the recommendation system. The recommendation system is configured to provide digital items as content recommendation to the users of the recommendation system. The method is executable by a server. The server is communicatively coupled with a non-distributed storage and a distributed storage. The distributed storage includes a plurality of nodes. The method comprises training, by the server, a matrix factorization model based on first user-item interaction data indicative of interactions between the users and the digital content items that have occurred by a first moment in time. The matrix factorization model is trained to predict user-item interaction data missing at the first moment in time. The method comprises during a first in-use iteration of the matrix factorization model, generating, by the server employing the trained matrix factorization model, first user embeddings for respective users and first item embeddings for respective digital items. The first user embeddings and the first item embeddings are an output of the trained matrix factorization model. The method comprises storing, by the server: (i) the first user embeddings in the non-distributed storage, where the first user embeddings are stored in association with a first value, and where the first value is indicative of the first in-use iteration of the matrix factorization model, and (ii) the first item embeddings in the distributed storage, the first item embeddings being stored in associated with the first value. The first item embeddings and the first user embeddings being stored in association with the first value is indicative of the first item embeddings and the first user embeddings being generated during a common in-use iteration of the matrix factorization model. The method comprises re-training, by the server, the matrix factorization model based on second user-item interaction data indicative of interactions between the users and the digital content items that have occurred by a second moment in time being after the first moment in time. The matrix factorization model is re-trained to predict user-item interaction data missing at the second moment in time. The method comprises during a second in-use iteration of the matrix factorization model generating, by the server employing the re-trained matrix factorization model, second user embeddings for respective users and second item embeddings for respective digital items. The second user embeddings and the second item embeddings are an output of the re-trained matrix factorization model. The method comprises storing, by the server: (i) the second user embeddings in the non-distributed storage in addition to the first user embeddings, where the second user embeddings are stored in association with a second value, and where the second value is indicative of the second in-use iteration of the matrix factorization model, and (ii) second item embeddings in the distributed storage instead of the respective first item embeddings by replacing the respective first item embeddings, and where the second item embeddings are stored in association with the second value. The second item embeddings and the second user embeddings being stored in association with the second value is indicative of the second item embeddings and the second user embeddings being generated during a common in-use iteration of the matrix factorization model. The method comprises at a third moment in time when the second item embeddings are stored on each one of the plurality of nodes of the distributed storage, removing, by the server, the first user embeddings associated with the first value from the non-distributed storage, such that the second user embeddings are stored in the non-distributed storage at the third moment in time, instead of both the first user embeddings and the second user embeddings.

In some embodiments of the method, the method further comprises monitoring, by the server, a storing process of the second item embeddings in the distributed storage.

In some embodiments of the method, the method further comprises determining, by the server, the third moment in time when the second item embeddings are stored on the each one of the plurality of nodes of the distributed storage.

In some embodiments of the method, the method further comprises receiving, by the server from the distributed storage, a confirmation of fault-tolerant storage of the second item embeddings, and where the third moment in time corresponds to a moment in time when the confirmation is received by the server.

In some embodiments of the method, the storing the second user embeddings is performed in a first amount of time, and where the storing the second item embeddings is performed in a second amount of time, and where the first amount of time is substantially shorter than the second amount of time.

In some embodiments of the method, the first amount of time is defined by (i) a moment in time when the server begins the storing of the second user embeddings in the non-distributed storage and (ii) a moment in time when the server ends the storing of the second user embeddings in the non-distributed storage. The second amount of time is defined by (i) a moment in time when the server begins the storing of the second item embeddings in the distributed storage, and (ii) the third moment in time when the server ends the storing of the second item embeddings.

In some embodiments of the method, the matrix factorization model is a Singular Value Decomposition (SVD) based model.

In some embodiments of the method, the non-distributed storage is a K-value storage.

In some embodiments of the method, the non-distributed storage is implemented as a single physical storage device.

In some embodiments of the method, at a fourth moment in time, between the second moment in time and the third moment in time, the method further comprises: (i) receiving, by the server, an indication of request for content recommendation for an electronic device associated with a given user, (ii) retrieving, by the server, from the distributed storage a target item embedding associated with a given digital item, where the given digital item is a potentially recommendable item for the given user, and where the target item embedding is either a given first item embedding for the given item or a given second item embedding for the given item, and where the given item embedding is associated with a target value being either the first value or the second value, and (iii) selecting, by the server, from the non-distributed storage a target user embedding associated with the given user amongst a first given user embedding associated with the given user and stored in association with the first value and a second given user embedding associated with the given user and stored in association with the second value. The selecting comprises determining, by the server, whether the target value of the given item embedding matches the first value or the second value. If the target value matches the first value, the selecting comprises selecting the first given user embedding as the target user embedding. If the target value matches the second value, the selecting comprises selecting the second given user embedding. The method further comprises generating, by the server, a ranking feature as a combination of the target user embedding and the target item embedding, the ranking feature to be used for ranking the given item amongst other items for the given user.

In a second broad aspect of the present technology, there is provided a server for storing data associated with users of a recommendation system and digital items recommendable in the recommendation system. The recommendation system is configured to provide digital items as content recommendation to the users of the recommendation system. The server is communicatively coupled with a non-distributed storage and a distributed storage. The distributed storage includes a plurality of nodes. The server is configured to train a matrix factorization model based on first user-item interaction data indicative of interactions between the users and the digital content items that have occurred by a first moment in time. The matrix factorization model is trained to predict user-item interaction data missing at the first moment in time. The server is configured to, during a first in-use iteration of the matrix factorization model, generate, by employing the trained matrix factorization model, first user embeddings for respective users and first item embeddings for respective digital items. The first user embeddings and the first item embeddings is an output of the trained matrix factorization model. The server is configured to store (i) the first user embeddings in the non-distributed storage, where the first user embeddings is stored in association with a first value, and where the first value is indicative of the first in-use iteration of the matrix factorization model, and (ii) the first item embeddings in the distributed storage, where the first item embeddings being stored in associated with the first value. The first item embeddings and the first user embeddings being stored in association with the first value is indicative of the first item embeddings and the first user embeddings being generated during a common in-use iteration of the matrix factorization model. The server is configured to re-train the matrix factorization model based on second user-item interaction data indicative of interactions between the users and the digital content items that have occurred by a second moment in time being after the first moment in time. The matrix factorization model is re-trained to predict user-item interaction data missing at the second moment in time. The server is configured to, during a second in-use iteration of the matrix factorization model, generate, by employing the re-trained matrix factorization model, second user embeddings for respective users and second item embeddings for respective digital items. The second user embeddings and the second item embeddings are an output of the re-trained matrix factorization model. The server is configured to store (i) the second user embeddings in the non-distributed storage in addition to the first user embeddings, where the second user embeddings are stored in association with a second value, and where the second value is indicative of the second in-use iteration of the matrix factorization model, and (ii) second item embeddings in the distributed storage instead of the respective first item embeddings by replacing the respective first item embeddings, where the second item embeddings are stored in association with the second value. The second item embeddings and the second user embeddings being stored in association with the second value is indicative of the second item embeddings and the second user embeddings being generated during a common in-use iteration of the matrix factorization model. The server is configured to, at a third moment in time when the second item embeddings are stored on each one of the plurality of nodes of the distributed storage, remove the first user embeddings associated with the first value from the non-distributed storage, such that the second user embeddings are stored in the non-distributed storage at the third moment in time, instead of both the first user embeddings and the second user embeddings.

In some embodiments of the server, the server is further configured to monitor a storing process of the second item embeddings in the distributed storage.

In some embodiments of the server, the server is further configured to determine the third moment in time when the second item embeddings are stored on the each one of the plurality of nodes of the distributed storage.

In some embodiments of the server, the server is further configured to receive, from the distributed storage, a confirmation of fault-tolerant storage of the second item embeddings, the third moment in time corresponding to a moment in time when the confirmation is received by the server.

In some embodiments of the server, the server configured to store the second user embeddings is performed in a first amount of time, and where the server configured to store the second item embeddings is performed in a second amount of time. The first amount of time is substantially shorter than the second amount of time.

In some embodiments of the server, the first amount of time is defined by (i) a moment in time when the server begins the storing of the second user embeddings in the non-distributed storage and (ii) a moment in time when the server ends the storing of the second user embeddings in the non-distributed storage, and where the second amount of time is defined by (i) a moment in time when the server begins the storing of the second item embeddings in the distributed storage, and (ii) the third moment in time when the server ends the storing of the second item embeddings.

In some embodiments of the server, the matrix factorization model is a Singular Value Decomposition (SVD) based model.

In some embodiments of the server, the non-distributed storage is a K-value storage.

In some embodiments of the server, the non-distributed storage is implemented as a single physical storage device.

In some embodiments of the server, at a fourth moment in time, between the second moment in time and the third moment in time, the server further configured to: (i) receive an indication of request for content recommendation for an electronic device associated with a given user, (ii) retrieve from the distributed storage a target item embedding associated with a given digital item, where the given digital item is a potentially recommendable item for the given user, and where the target item embedding is either a given first item embedding for the given item or a given second item embedding for the given item, and where the given item embedding is associated with a target value being either the first value or the second value; (iii) select from the non-distributed storage a target user embedding associated with the given user amongst (i) a first given user embedding associated with the given user and stored in association with the first value and (ii) a second given user embedding associated with the given user and stored in association with the second value. To select the server is configured to determine whether the target value of the given item embedding matches the first value or the second value. If the target value matches the first value, the server is configured to select the first given user embedding as the target user embedding. If the target value matches the second value, the server is configured to select the second given user embedding. The server is further configured to generate a ranking feature as a combination of the target user embedding and the target item embedding, the ranking feature to be used for ranking the given item amongst other items for the given user.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
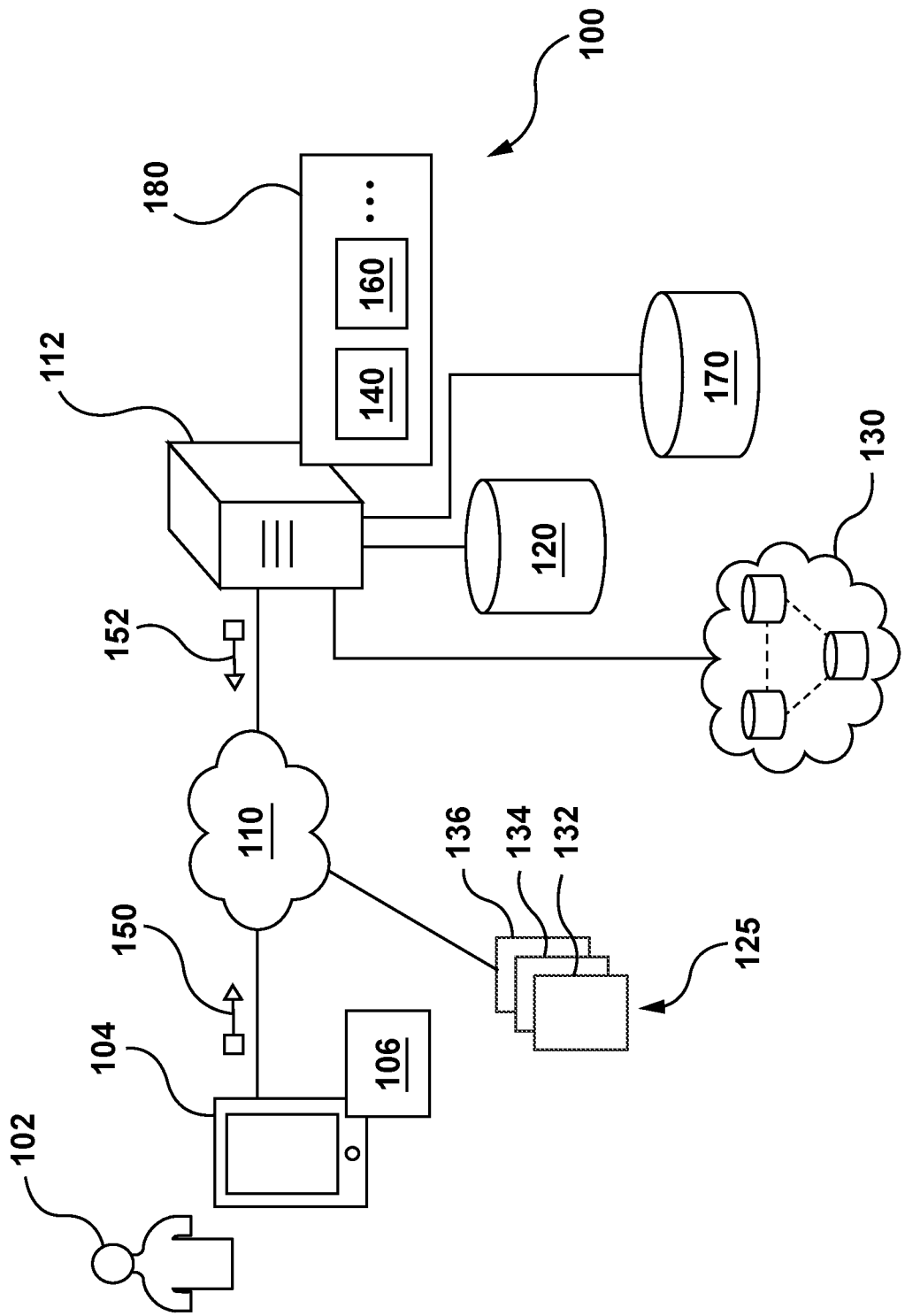
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide digital content recommendations to users of the system 100. For example, a user 102 (a given one of a plurality of users of the system 100) may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100" or a "training system 100"). However, embodiments of the present technology can be equally applied to other types of the system 100, as will be described in greater detail herein below.

Electronic Device

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

It should be noted that, although only the user 102 associated with the electronic device 104 is depicted in FIG. 1, it is contemplated that the user 102 associated with the electronic device 104 is a given user from the plurality of users of the system 100, and where each one of the plurality of users (not depicted) can be associated with a respective electronic device (not depicted).

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user 102 to receive (or otherwise access) digital content recommendations provided by the system 100, as will be described in greater detail herein below.

How the recommendation application 106 is implemented is not particularly limited. One example of the recommendation application 106 may include the user 102 accessing a web site associated with the recommendation service to access the recommendation application 106. For example, the recommendation application 106 may be accessed by typing in (or otherwise copy-pasting or selecting a link) an URL associated with the recommendation service. Alternatively, the recommendation application 106 may be an application downloaded from a so-called "app store", such as APPSTORE™ or GOOGLEPLAY™ and installed/executed on the electronic device 104. It should be expressly understood that the recommendation application 106 may be accessed using any other suitable means. In yet additional embodiments, the recommendation application 106 functionality may be incorporated into another application, such as a browser application (not depicted) or the like. For example, the recommendation application 106 may be executed as part of the browser application, for example, when the user 102 starts the browser application, the functionality of the recommendation application 106 may be executed.

Generally speaking, the recommendation application 106 comprises a recommendation interface (not depicted) being displayed on a screen of the electronic device 104.

Figure 8:
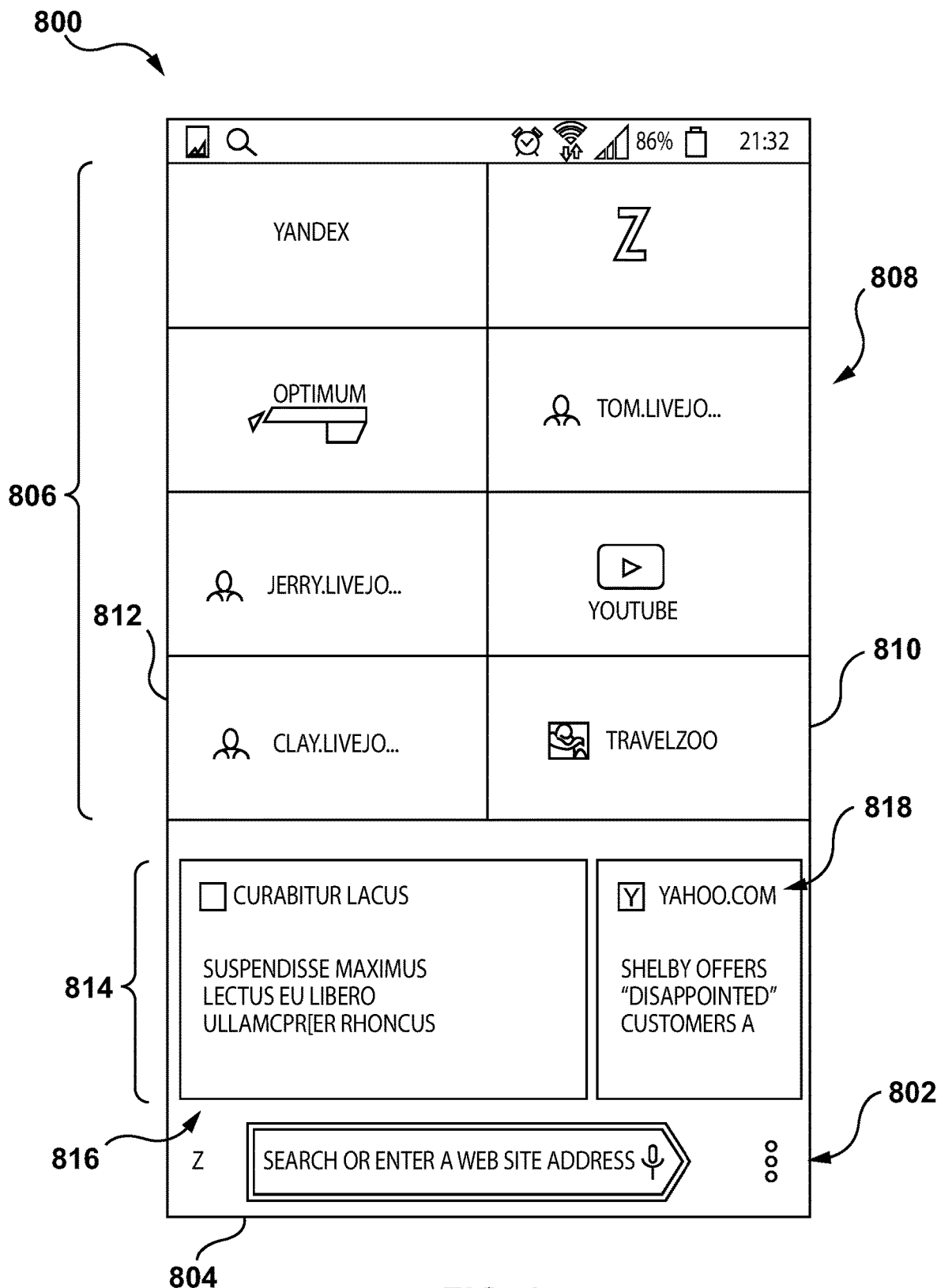
FIG. 8 depicts a screen shot of a recommendation interface implemented in accordance with non-limiting embodiment of the present technology.

With reference to FIG. 8, there is depicted a screen shot 800 of the recommendation interface implemented in accordance with a non-limiting embodiment of the present technology (the example of the recommendation interface being depicted as displayed on the screen of the electronic device 104 being implemented as a smart phone).

In some embodiments of the present technology the recommendation interface may be presented/displayed when the user 102 of the electronic device 104 actuates (i.e. executes, run, background-run or the like) the recommendation application 106. Alternatively, the recommendation interface may be presented/displayed when the user 102 opens a new browser window and/or activates a new tab in the browser application. For example, in some embodiments of the present technology, the recommendation interface may act as a "home screen" in the browser application.

The recommendation interface includes a search interface 802. The search interface 802 includes a search query interface 804. The search query interface 804 may be implemented as an "omnibox" which allows entry of a search query for executing a search or a given network address (such as a Universal Remote Locator) for identifying a given network resource (such as a web site) to be accessed. However, the search query interface 804 may be configured to receive one or both of: entry of the search query for executing the search or a given network address (such as a Universal Remote Locator) for identifying a given network resource (such as a web site) to be accessed.

The recommendation interface further includes a links interface 806. The links interface 806 includes a plurality of tiles 808—of which eight are depicted in FIG. 8—only two of which are numbered in FIG. 8—a first tile 810 and a second tile 812.

Using the example of the first tile 810 and the second tile 812—each of the plurality of tiles 808 includes (or acts as) a link to either (i) a web site marked as "favourite" or otherwise marked by the user 102, (ii) a previously visited web site or (iii) the like. The plurality of tiles 808, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 may be different. As such, some or all of the plurality of tiles 208 may be implemented as differently shaped buttons, as hyperlinks presented in a list or the like.

As an example, the first tile 810 contains a link to a TRAVELZOO™ web site and the second tile 812 contains a link to a personal live journal web site. Needless to say, the number and content of the individual ones of the plurality of tiles 808 is not particularly limited.

For example, the number of the tiles within the plurality of tiles 808 may be pre-selected by the provider of the recommendation application 106. In some embodiments of the present technology, the number of tiles within the plurality of tiles 808 may be pre-selected based on the size and/or resolution of the screen of the electronic device 104 executing the recommendation application 106. For example, a first number of tiles may be pre-selected for the electronic device 104 executed as a smartphone, a second number of tiles may be pre-selected for the electronic device 104 executed as a tablet, and a third number of tiles may be pre-selected for the electronic device 104 executed as a laptop or desktop computer.

The recommendation interface further includes a recommended digital content set 814. The recommended digital content set 814 includes one or more recommended digital documents, such as a first recommended digital document 816 and a second recommended digital document 818 (the second recommended digital document 818 only partially visible in FIG. 8). Naturally, the recommended digital content set 814 may have more recommended digital documents. In the embodiment depicted in FIG. 8 and in those embodiments where more than one recommended digital documents are present, the user 102 may scroll through the recommended digital content set 814. The scrolling may be achieved by any suitable means. For example, the user 102 can scroll the content of the recommended digital content set 814 by means of actuating a mouse device (not depicted), a key board key (not depicted) or interacting with a touch sensitive screen (not depicted) of or associated with the electronic device 104.

Example provided in FIG. 8 is just one possible implementation of the recommendation interface. Another example of the implementation of the recommendation interface, as well as an explanation of how the user 102 may interact with the recommendation interface 108 is disclosed in a co-owned US patent entitled "A COMPUTER-IMPLEMENTED METHOD OF GENERATING A CONTENT RECOMMENDATION INTERFACE", issued on Aug. 27, 2019 and Ser. No. 10/394,420; content of which is incorporated by reference herein in its entirety.

Returning to the description of FIG. 1, the electronic device 104 is configured to generate a request 150 for digital content recommendation. The request 150 may be generated in response to the user 102 providing an explicit indication of the user desire to receive a digital content recommendation. For example, the recommendation interface 108 may provide a button (or another actuatable element) to enable the user 102 to indicate her/his desire to receive a new or an updated digital content recommendation.

As an example only, the recommendation interface may provide an actuatable button that reads "Request content recommendation". Within these embodiments, the request 150 for digital content recommendation can be thought of as "an explicit request" in a sense of the user 102 expressly providing a request for the digital content recommendation.

In other embodiments, the request 150 for digital content recommendation may be generated in response to the user 102 providing an implicit indication of the user desire to receive the digital content recommendation. In some embodiments of the present technology, the request 150 for digital content recommendation may be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO!™ browser or any other proprietary or commercially available browser application), the request 150 for digital content recommendation may be generated in response to the user 102 opening the browser application and may be generated, for example, without the user 102 executing any additional actions other than activating the browser application.

Optionally, the request 150 for digital content recommendation may be generated in response to the user 102 opening a new tab of the already-opened browser application and may be generated, for example, without the user 102 executing any additional actions other than activating the new browser tab.

Therefore, it is contemplated that in some embodiments of the present technology, the request 150 for digital content recommendation may be generated even without the user 102 knowing that the user 102 may be interested in obtaining a digital content recommendation.

Optionally, the request 150 for digital content recommendation may be generated in response to the user 102 selecting a particular element of the browser application and may be generated, for example, without the user 102 executing any additional actions other than selecting/activating the particular element of the browser application.

Examples of the particular element of the browser application include but are not limited to:

an address line of the browser application bar;
a search bar of the browser application and/or a search bar of a search engine web site accessed in the browser application;
an omnibox (combined address and search bar of the browser application);
a favourites or recently visited network resources pane; and
any other pre-determined area of the browser application interface or a network resource displayed in the browser application.

How the content for the recommended digital content set 814 is generated and provided to the electronic device 104 will be described in greater detail herein further below.

Figure 10:
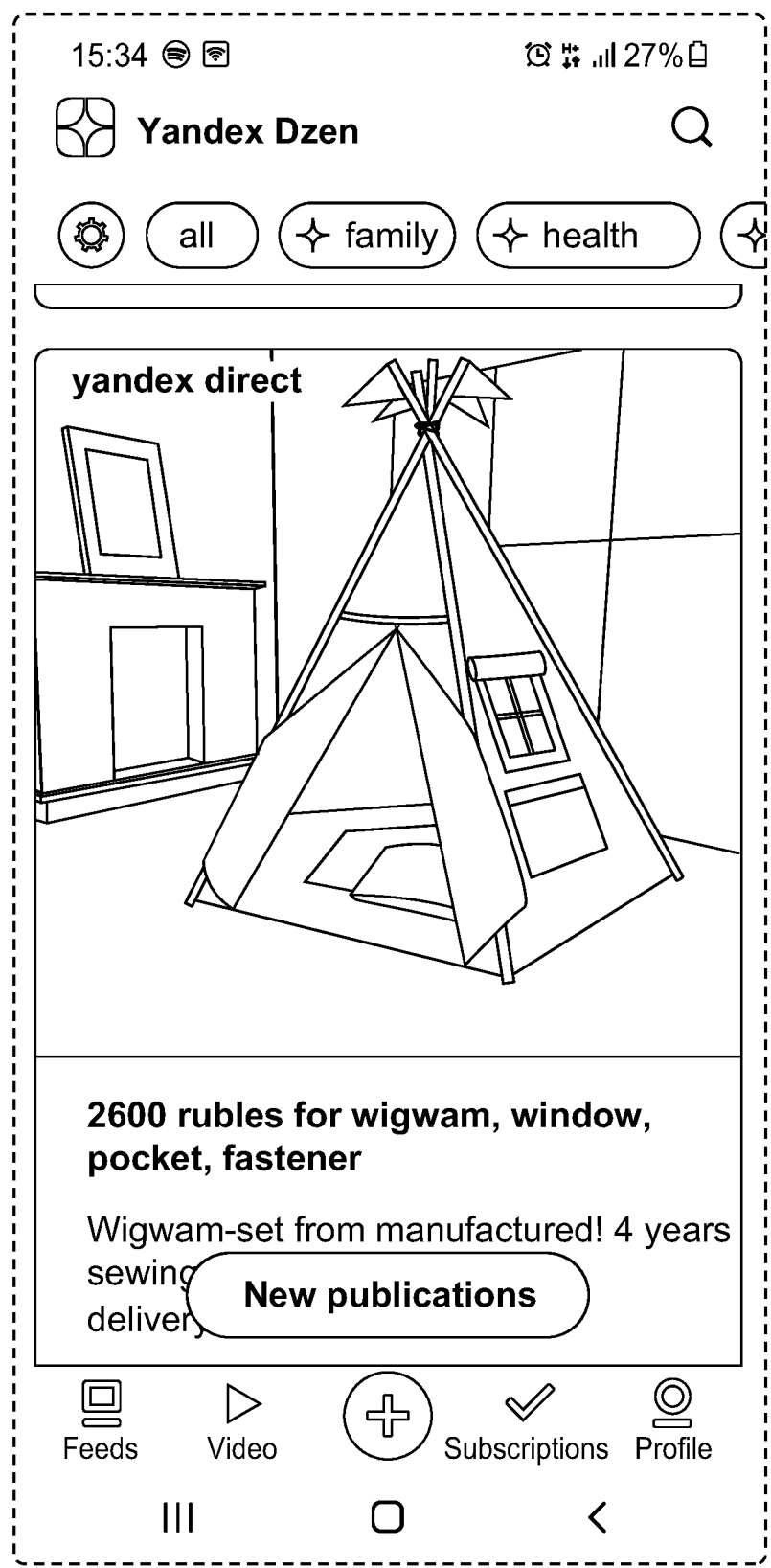
FIG. 10 depicts a screen shot of a recommendation interface implemented in accordance with an other non-limiting embodiment of the present technology.

It should be noted that the recommended digital content set 814 may be updated continuously, or in other words, additional digital items may be transmitted to the electronic device 104 such that the user 102 is provided with an "infinite" content recommendation feed. For example, with reference to FIG. 10, there is depicted a screen shot 1000 of the recommendation interface implemented in accordance with an other non-limiting embodiment of the present technology (the example of the recommendation interface being depicted as displayed on the screen of the electronic device 104 being implemented as a smart phone). It can be said that the recommendation interface of FIG. 10 may be configured to provide a continuously-updated feed of recommendation items to the user 102.

Communication Network

The electronic device 104 is communicatively coupled to a communication network 110 for accessing a recommendation server 112 (or simply the server 112).

In some non-limiting embodiments of the present technology, the communication network 110 may be implemented as the Internet. In other embodiments of the present technology, the communication network 110 can be implemented differently, such as any wide-area communication network, local-area communication network, a private communication network and the like.

How a communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Plurality of Network Resources

Also coupled to the communication network 110 is a plurality of network resources 125 that includes a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. Respective digital content of the first network resource 132, the second network resource 134 and the plurality of additional network resources 136 is not particularly limited.

It is contemplated that any given one of the first network resource 132, the second network resource 134 and the plurality of additional network resources 136 may host (or in other words, host) digital documents having potentially different types of digital content. As it will become apparent from the description herein further below, the plurality of additional network resources 136 may be hosting at least some of the potentially recommendable content items of the system 100.

For example, digital content of digital documents may include but is not limited to: audio digital content for streaming or downloading, video digital content for streaming or downloading, news, blogs, information about various government institutions, information about points of interest, thematically clustered content (such as content relevant to those interested in kick-boxing), other multi-media digital content, and the like.

In another example, digital content of the digital documents hosted by the first network resource 132, the second network resource 134 and the plurality of additional network resources 136 may be text-based. Text-based digital content may include but is not limited to: news, articles, blogs, information about various government institutions, information about points of interest, thematically clustered digital content (such as digital content relevant to those interested in kick-boxing), and the like. It is contemplated that in at least some embodiments of the present technology, "raw" textual data from text-based content items may be extracted by a server 112 and stored in a recommendation storage 120 for further processing.

It should be noted, however, that "text-based" digital content does not intend to mean that the given digital document only contains text to the exclusion of other type of multi-media elements. On the contrary, the given text-based digital document may include text elements, as well as potentially other type of multi-media elements. For instance, a given text-based digital document that is an article may include text, as well as photos. As another example, a given text-based digital document that is a blog may include text, as well as embedded video elements.

It should be noted digital content items from a given network resource may be published by a publishing entity, or simply a "publisher". Generally speaking, a given publisher generates digital content and publishes it such that its digital content becomes available on a given network resource. It should be noted that a given publisher usually generates and publishes digital content having a common type and/or common topic. For example, a given publisher that usually publishes digital content related to sport news, is likely to publish new digital content also related to sport news.

Generally speaking, digital content items are potentially "discoverable" by the electronic device 104 via various means. For example, the user 102 of the electronic device 104 may use a browser application (not depicted) and enter a Universal Resource Locator (URL) associated with the given one of the first network resource 132, the second network resource 134 and the plurality of additional network resources 136. In another example, the user 102 of the electronic device 104 may execute a search using a search engine (not depicted) to discover digital content of one or more of the first network resource 132, the second network resource 134 and the plurality of additional network resources 136. As has been mentioned above, these are useful when the user 102 knows apriori which digital content the user 102 is interested in.

In at least some embodiments of the present technology, it is contemplated that the user 102 may appreciate one or more digital content items potentially recommendable by a recommendation system 180 hosted by the server 112. How the server 112 and the recommendation system 180 can be implemented in some embodiments of the present technology will now be described.

Recommendation Server

The server 112 may be implemented as a conventional computer server. In an example of an embodiment of the present technology, the server 112 may be implemented as a Dell™ PowerEdge™ Server running the Microsoft™ Windows Server™ operating system. Needless to say, the server 112 may be implemented in any other suitable hardware, software, and/or firmware, or a combination thereof. In the depicted non-limiting embodiments of the present technology, the server 112 is a single server. In alternative non-limiting embodiments of the present technology, the functionality of the server 112 may be distributed and may be implemented via multiple servers.

Generally speaking, the server 112 is configured to (i) receive from the electronic device 104 the request 150 for digital content recommendation and (ii) responsive to the request 150, generate a recommended digital content message 152 to be transmitted to the electronic device 104.

It is contemplated that at least some of digital content in the recommended digital content message 152 may be specifically generated or otherwise customized for the user 102 associated with the electronic device 104. As part of digital content in the recommended digital content message 152, the server 112 may be configured to provide inter alia information indicative of the recommended digital content set 814 to the electronic device 104 for display to the user 102 (on the recommendation interface of the recommendation application 106).

It should be understood that the recommended digital content set 814 provided to the user 102 by the server 112 may comprise given digital content that is available at one of the plurality of network resources 125, without the user 102 knowing apriori about the given digital content. How the recommended digital content set 814 is generated by the server 112 will be described in greater detail herein further below.

As previously alluded to, the recommendation server 112 is configured to execute a plurality computer-implemented procedures that together are referred to herein as the "recommendation system" 180. In the context of the present technology, the server 112 providing recommendation services via the recommendation system 180 is configured to employ one or more Machine Learning Algorithms (MLAs) for supporting a variety of search engine services. Notably, the recommendation system 180 one or more MLAs can be used by the server 112 in order to generate the recommended digital content set 814.

Generally speaking, MLAs are configured to "learn" from training samples and make predictions on new (unseen) data. MLAs are usually used to first build a model based on training inputs of data in order to then make data-driven predictions or decisions expressed as outputs, rather than following static computer-readable instructions. For that resource, MLAs can be used as estimation models, ranking models, classification models and the like.

It should be understood that different types of the MLAs having different architectures and/or topologies may be used for implementing the MLA in some non-limiting embodiments of the present technology. Nevertheless, the implementation of a given MLA by the server 112 can be broadly categorized into two phases—a training phase and an in-use phase. First, the given MLA is trained in the training phase. Then, once the given MLA knows what data to expect as inputs and what data to provide as outputs, the MLA is actually run using in-use data in the in-use phase.

In at least some embodiments of the present technology, the server 112 may be configured to execute a decision-tree based MLA 140. Broadly speaking, a given decision-tree based MLA is a machine learning model having one or more "decision trees" that are used (i) to go from observations about an object (represented in the branches) to conclusions about the object's target value (represented in the leaves). In one non-limiting implementation of the present technology, the decision-tree based MLA 140 can be implemented in accordance with the CatBoost framework.

How the decision-tree based MLA 140 (relevance estimation model) can be trained in accordance with at least some embodiments of the present technology is disclosed in a US Patent Publication no. 2019/0164084, entitled "METHOD OF AND SYSTEM FOR GENERATING PREDICTION QUALITY PARAMETER FOR A PREDICATION MODEL EXECUTED IN A MACHINE LEARNING ALGORITHM", published on May 30, 2019, content of which is incorporated by reference herein in its entirety. Additional information regarding the CatBoost library, its implementation, and gradient boosting algorithms is available at https://catboost.ai.

In at least some embodiments of the present technology, it is contemplated that the server 112 may be configured to use the decision-tree based MLA 140 in order to predict a ranked list of at least some potentially recommendable content items. As it will be described herein further below with reference to FIG. 7, the server 112 may be configured to provide the decision-tree based MLA 140 with input data including (i) data associated with the user 102, and (ii) data associated with a plurality of digital content items (including items 501, and 502), and the decision-tree based MLA 140 is configured to output a ranked list of content items 780.

Returning to the description of FIG. 1, in at least some embodiments of the present technology, the server 112 may be configured to execute a (one or more) matrix factorization model 160 and which is used by the server 112 for inter alia generating in-use data for the decision-tree based MLA 140. Broadly speaking, a given matrix factorization model can be said to be a machine learning model used to decompose "matrix-structure data" into its "constituent elements". In one non-limiting example, the matrix factorization model 160 may be implemented by the server 112 as a given Singular Value Decomposition (SVD) based model. In some embodiments of the present technology, the matrix factorization model 160 may be embodied as Neural Network (NN) trained to decompose matrix-structured data into one or more vectors.

It should be noted that the manner in which the matrix factorization model 160 can be implemented by the server 112 in some non-limiting embodiments of the present technology is generally described in US patent publication number 2018/0075137, entitled "METHOD AND APPARATUS FOR TRAINING A MACHINE LEARNING ALGORITHM (MLA) FOR GENERATING A CONTENT RECOMMENDATION IN A RECOMMENDATION SYSTEM AND METHOD AND APPARATUS FOR GENERATING THE RECOMMENDED CONTENT USING THE MLA, published on May 15, 2018; the content of which is incorporated herein by reference in its entirety and, therefore, will not be discussed in greater detail herein below.

Irrespective of a particular implementation of the matrix factorization model 160, the server 112 is configured to employ the matrix factorization model 160 generating different types of "embeddings". Broadly speaking, an embedding is a relatively low-dimensional space into which you can translate high-dimensional vectors. Embeddings make it easier to do machine learning on large inputs like sparse vectors representing words, for example. Ideally, an embedding captures some of the semantics of the input by placing semantically similar inputs close together in the embedding space. It is also contemplated that embeddings can be learned and reused across models.

As it will be described in greater details herein further below, the server 112 may be configured to use the matrix factorization model 160 to generate two types of embeddings based on a matrix including user-item interaction data—that is, "item embeddings", and "user embeddings". This means that embedding generated by the matrix factorization model 160 may be of a collaborative-type in some (but not all) embodiments of the present technology.

It should be noted that in at least some embodiments of the present technology, the server 112 may be configured to use the matrix factorization model 160 for performing what is called Collaborative Filtering (CF) of recommendation content. Broadly speaking, CF based methods leverage historical interactions between users and digital content items for filtering out less desirable content when making recommendations to users. However, CF based methods typically suffer from limited performance when user-item interactions are very sparse, which is common for scenarios such as online shopping or any other recommendation platform having an very large potentially recommendable item set. As it will become apparent from the description herein further below, the developers of the present technology have devised methods and systems for reducing the amount of time necessary for the recommendation system 180 to provide recommendation content to a given user.

In some embodiments of the present technology, the server 112 may be configured to, in a sense, "update" the matrix factorization model 160 based on most recent collection of historical interactions collected by the recommendation system 180. Indeed, as the recommendation system 180 provides recommendation services to its users, new information indicative of user-item interactions can be collected and stored, thereby increasing the amount of user-item interaction data available for (re-)training the matrix factorization model 160. Also, new digital content may be added to the recommendation pool over time and for which the recommendation system 180 may require item embeddings for relevance estimation purposes. For example, the server 112 may be configured to perform scheduled or otherwise pre-determined training phases of the matrix factorization model 160 based on most recent user-item interaction data available at the recommendation storage 120.

As it will become apparent from the description herein further below, the server 112 may be configured to use the matrix factorization model 160 for generating different "versions" of user embeddings and item embeddings, and where each version corresponds to outputs of the matrix factorization model 160 after respective training phases of the matrix factorization model 160. In other words, the matrix factorization model 160 having been trained based on a first version of user-item interaction data is configured to generate a first version of user and item embeddings, while the matrix factorization model 160 having been trained based on a second (updated) version of user-item interaction data is configured to generate a second (updated) version of user and item embeddings.

Recommendation Storage

The server 112 is communicatively coupled to a recommendation storage 120. The recommendation storage 120 is depicted as a separate entity from the server 112. However, it is contemplated that the recommendation storage 120 may be implemented integrally with the server 112, without departing from the scope of the present technology. In some embodiments, the recommendation storage 120 may be a non-distributed storage. Alternatively, functionalities of the recommendation storage 120 as described below may be distributed between more than one physical devices.

Generally speaking, the recommendation storage 120 is configured to store data generated, retrieved and/or processed by the server 112 hosting the recommendation system 180 for temporary and/or permanent storage thereof. For example, the storage 120 may be configured to store inter alia data for supporting the recommendation services of the recommendation system 180. It is contemplated that the recommendation storage 120 may host a database for storing said data in a structured manner.

For example, the storage 120 is configured to store information associated with respective items of the recommendation system 180, hereinafter generally referred to as "item data". The item data includes information about respective digital content discovered and catalogued by the server 112. For example, the item data may include the digital content of respective digital content items that are potentially recommendable by the recommendation system 180.

The nature of digital content that is potentially recommendable by the server 112 is not particularly limited. Some examples of digital content that is potentially recommendable by the server 112 include, but are not limited to, digital documents such as:
- a news article;
- a publication;
- a web page;
- a post on a social media web site;
- a new application to be downloaded from an app store;
- a new song (music track) to play/download from a given network resource;
- an audiobook to play/download from a given network resource;
- a podcast to play/download from a given network resource;
- a new movie (video clip) to play/download from a given network resource;
- a product to be bought from a given network resource; and
- a new digital document uploaded for viewing on a social media web site (such as a new photo uploaded to an INSTRAGRAM™ or FACEBOOK™ account).

In other non-limiting embodiments, the item data may comprise information about one or more item features associated with respective digital content items. For example, the storage 120 may store data associated with respective items indicative of, but not limited to:
- popularity of a given item;
- click-through-rate for the given item;
- time-per-click associated with the given item;
- other statistical data associated with the given item; and others.

It should also be noted that the storage 120 may be populated with additional information about the plurality of users of the recommendation service, hereinafter generally referred to as "user data". For example, the server 112 may be configured to collect and store in the storage 120 user-profile data associated with respective users of the recommendation system 180 such as, but not limited to: name, age, gender, user-selected types of digital content that (s)he desires, and the like. Other information about the plurality of users of the recommendation service may also be stored in the storage 120 as part of the user data, without departing from the scope of the present technology.

It should also be noted that the storage 120 may also be configured to store information about interactions between digital content items and users, hereinafter generally referred to as "user-item interaction data". For example, the server 112 may track and gather a variety of different user-item interactions between users and previously recommended items.

For example, let it be assumed that a given user interacted with a given digital content item being a given digital document previously recommended thereto via the recommendation service. As such, the server 112 may track and gather user-item interaction data of the given user with the given digital document in a form of user events that occurred between the given user and the given digital item. Examples of different types of user events that may be tracked and gathered by the server 112 may include, but are not limited to:
- the given user "scrolled over" the given digital item;
- the given user "liked" the given digital item;
- the given user "disliked" the given digital item;
- the given user "shared" the given digital item;
- the given user "clicked" or "selected" the given digital item;
- the given user spent an amount of "interaction time" consulting the given digital item; and
- the given user purchased/ordered/downloaded the given digital item.

Figure 2:
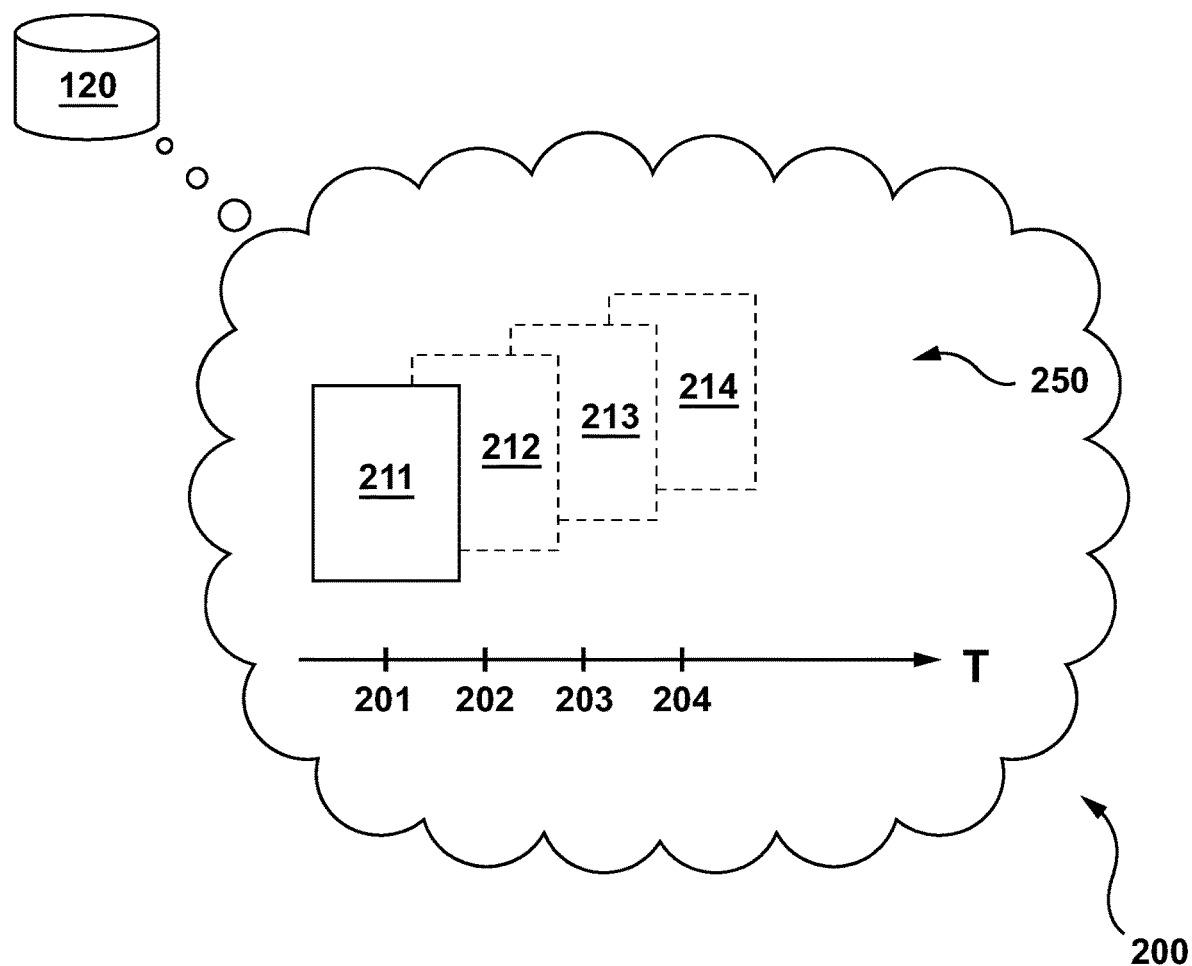
FIG. 2 depicts a representation of data stored by a recommendation storage of the system of FIG. 1, in accordance with non-limiting embodiments of the present technology.

As previously alluded to, as the recommendation system 180 provides recommendation services to its users, new user-item interaction data is being collected and stored in the recommendation storage 120. To better illustrate this, reference will now be made to FIG. 2 depicting a representation 200 of how user-item interaction data is collected and stored in the recommendation storage 120 and what user-item interaction data can be accessed by the server 112 at different moments in time.

For example, as illustrated, at a moment in time 201, the recommendation storage 120 stores user-item interaction data 211. The user-item interaction data 211 comprises user-item interaction data collected and stored by server 112 in the recommendation storage 120 during a time period leading to the moment in time 201. However, as alluded to above, over time, the server 112 is configured to collect and store additional user-item interaction data in the recommendation storage 120. As such, at moment in time 202, the recommendation storage 120 stores user-item interaction data 212. The user-item interaction data 212 comprises user-item interaction data collected and stored by server 112 in the recommendation storage 120 during a time period leading to the moment in time 202. It can also be said that the user-item interaction data 212 may comprise user-item interaction data 211 and additional user-item interaction data collected between the moment in time 201 and the moment in time 202. As a result, if the server 112 accesses the recommendation storage 120 at the moment in time 201, the user-item interaction data 211 is available for retrieval. However, if the server 112 accesses the recommendation storage 120 at the moment in time 202, the user-item interaction data 212 is available for retrieval. Similarly, if the server 112 accesses the recommendation storage 120 at a moment in time 203, user-item interaction data 213 is available for retrieval. Similarly, if the server 112 accesses the recommendation storage 120 at a moment in time 204, user-item interaction data 214 is available for retrieval.

As it will become apparent from the description herein further below, the server 112 may be configured to access the recommendation storage 120 at different moments in time in order to retrieve (most recent) user-item interaction data for training (and re-training) the matrix factorization model 160.

Non-Distributed and Distributed Storages

The server 112 is also communicatively coupled with a non-distributed storage 170 and a distributed storage 130. How the non-distributed storage 170 and the distributed storage 130 are implemented in the context of the present technology will now be discussed in turn.

It should be noted that the non-distributed storage 170 may be implemented on a (single) physical device. In some embodiments, the non-distributed storage 170 may not be a separate entity from the server 112 (i.e. the non-distributed storage 170 may be integral to the server 112). It is contemplated that the non-distributed storage 170 may host a database for storing data in a structured manner.

In at least some non-limiting embodiments of the present technology, the non-distributed storage 170 may be implemented as a given Key-Value (KV) storage. Broadly speaking, a KV storage is a storage designed for storing, retrieving, and managing associative arrays, a data structure commonly known as a dictionary or a hash table. Dictionaries contain a collection of objects, or records, which in turn have many different fields within them, each for containing data. These records are stored and retrieved using a key that uniquely identifies the record and is used to find associated data within a database. It can be said that KV storages treat data as a single opaque collection, which may have different fields for every record. This offers considerable flexibility and can be implemented by employing object-oriented programming techniques, for example KV storages often use far less memory to store data than other types of storages, which can lead to large performance gains in certain workloads.

Figure 3:
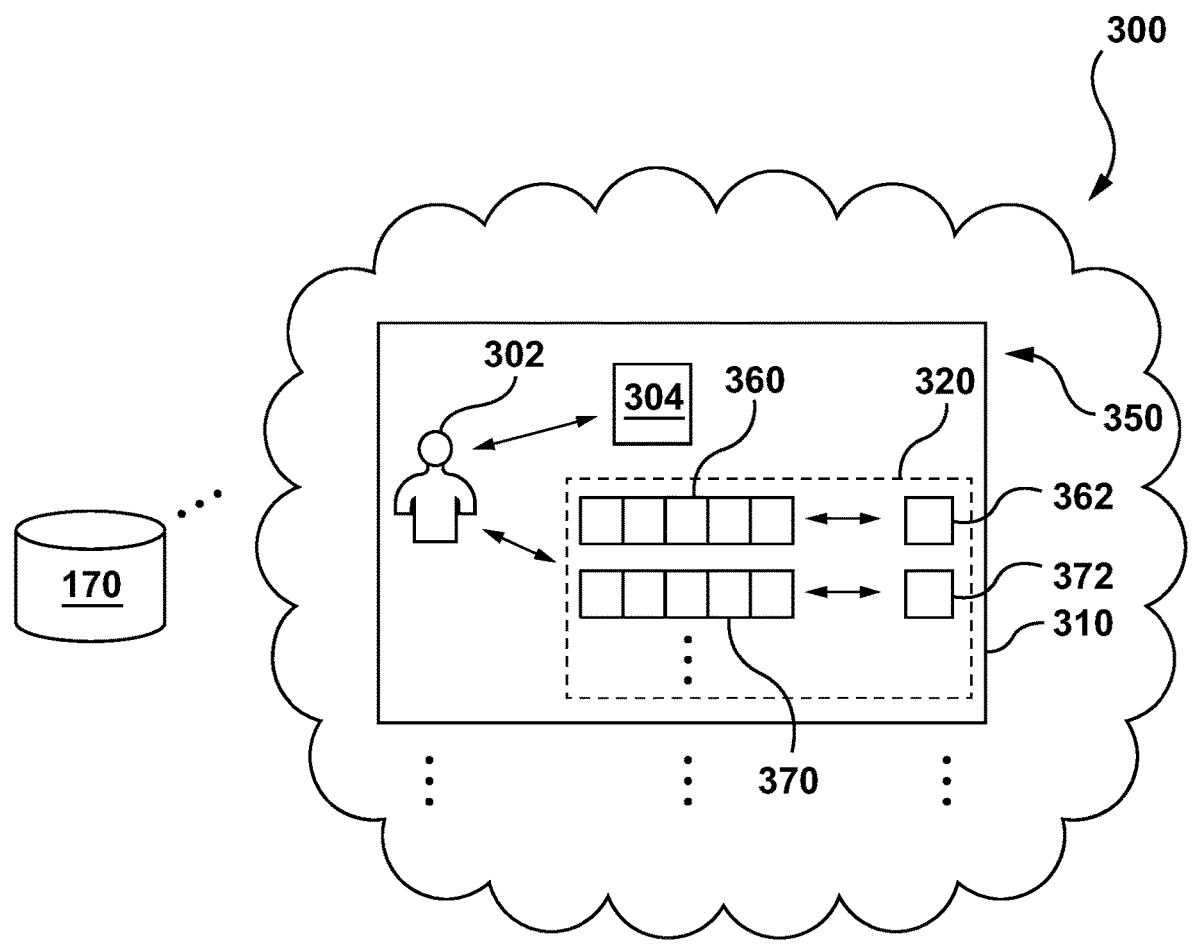
FIG. 3 depicts a representation of data stored by a non-distributed storage of the system of FIG. 1, in accordance with non-limiting embodiments of the present technology.

With reference to FIG. 3, there is depicted a representation 300 of at least some data being stored in the non-distributed storage 170. It should be noted that the non-distributed storage 170 is configured to store at least some data associated with users of the recommendation system 180. More particularly, the non-distributed storage 170 may be configured to store for a given user one or more user embeddings generated by the server 112 employing the matrix factorization model 160.

To better illustrate this, reference will now be made to a representation 350 of user-specific data 310 that is stored in the non-distributed storage 170 for a user 302. The user-specific data 310 comprises information for identifying the user 302. For example, the user-specific data 310 may be associated with a "user ID" uniquely associated with the user 302. In one implementation, this user ID can be used as a "key" in a KV storage for accessing the data associated with the user 302.

The user-specific data 310 also comprises at least one user embedding associated with the user 302. As seen, the user 302 is associated with embedding data 320 comprising a first user embedding 360 associated with a first version value 362 and a second user embedding 370 associated with a second version value 372. The first version value 362 is indicative of a first in-use iteration of the matrix factorization model 160 and the second version value 372 is indicative of a second in-use iteration of the matrix factorization model 160. Furthermore, it can be said that the first version value 362 and the second version value 372 are indicative of respective versions of user embeddings—that is, the first version value 362 is indicative of that the first user embedding 360 has been generated by the matrix factorization model 160 after a first training phase thereof (based on a first version of user-item interaction data), and the second version value 372 is indicative of that the second user embedding 370 has been generated by the matrix factorization model 160 after a second training phase thereof (based on a second, updated, version of user-item interaction data).

As it will become apparent from the description herein further below regarding the distributed storage 130, developers of the present technology have realized that storing user embeddings in association with respective users of the recommendation system 180 in the non-distributed storage 170, as opposed to the distributed storage 130, may be advantageous. At least one advantage of storing the user embeddings in the non-distributed storage 170 arises due to that the recommendation systems typically comprises a number of users that is significantly larger than the number of digital items in the recommendation pool. As a result, due to the large number of user embeddings that are to be stored, storing user embeddings in the non-distributed storage 170 as opposed to the distributed storage 130 may increase the responsiveness of the recommendation system 180 (amount of time between receipt of indication for providing recommendation and the provision of the content to the user).

As it will also become apparent from the description herein further below, the non-distributed storage 170 may store different numbers of user embeddings at different moments in times in association with a given user of the recommendation system 180. Just as an example, after the first in-use iteration of the matrix factorization model 160 (having undergone the first training phase), the server 112 may store in the non-distributed storage 170 the first user embedding 360 in association with the first version value 362. The first user embedding 360 is an output of the first in-use iteration of the matrix factorization model 160. Therefore, at a first given moment in time, the non-distributed storage 170 may store only one user embedding.

However, after the second in-use iteration of the matrix factorization model 160 (having undergone the second training phase), the server 112 may store in the non-distributed storage 170 the second user embedding 370 in association with the second version value 372, in addition to the first user embedding 360 associated with the first version value 362. The second user embedding 370 is an output of the second in-use iteration of the matrix factorization model 160. Therefore, at a second given moment in time, the non-distributed storage 170 may store two user embeddings, each corresponding to a respective version of user embeddings for the user 302 generated by the matrix factorization model 160.

Furthermore, at a given third moment in time, the server 112 may be configured to remove from the non-distributed storage 170 data representative of the first user embedding 360 and the first version value 362, such that the second user embedding 370 is stored in the non-distributed storage 170 at the given third moment in time instead of both the first user embedding 360 and the second user embedding 370.

How the server 112 may be configured to determine when to remove/delete data representative of the first user embedding 360 and the first version value 362 (i.e., the given third moment in time) and/or how the server 112 is triggered to remove/delete said data will be described with greater details herein further below.

Figure 4:
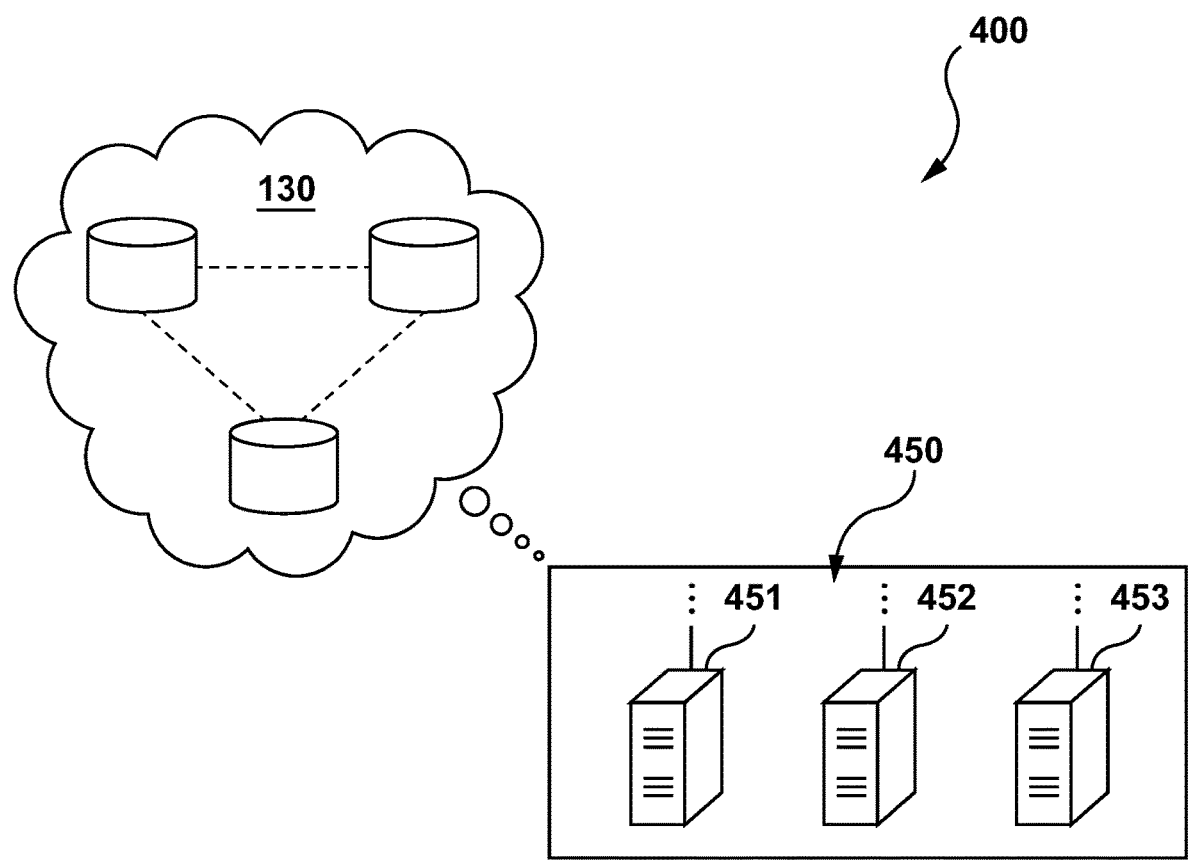
FIG. 4 depicts a representation of data stored by a distributed storage of the system of FIG. 1, in accordance with non-limiting embodiments of the present technology.

With reference to FIG. 4, there is depicted a representation 400 of how the distributed storage 130 is implemented in at least some embodiments of the present technology. As opposed to the non-distributed storage 170, the distributed storage 130 is configured to store information on more than one "node", often in a replicated fashion. For example, the data in the distributed storage 130 may be stored on a number of physical devices. In one embodiment, the data may be stored on multiple computer servers located in the same physical location (e.g. a data center)—or maybe dispersed over a network of interconnected computers.

For example, the data stored by the distributed storage 130 may be stored on a plurality of servers 450 comprising a first server 451, a second server 452, and a third server 453. Although the plurality of servers 450 is illustrated as including only three servers, it is contemplated that the plurality of servers 450 may comprise a different number of servers, without departing from the scope of the present technology.

It is contemplated that the plurality of servers 450 may be located in different geographic locations. In one non-limiting example, the first server 451 and the second server 452 may be located near a first geographic location, while the third database server 453 may be located near a second geographic location. In at least one embodiment, a given one of the plurality of servers 450 may host a respective node from the more than one nodes of the distributed storage 130. In at least some embodiments of the present technology, it is contemplated that the more than one nodes of the distributed storage 130 may correspond to respective servers from the plurality of servers 450.

It should be noted that when the server 112 requests the data to be stored in the distributed storage 130, the distributed storage 130 may be configured to store said data in a distributed manner, for fault-tolerance purposes and/or load balancing purposes, for example. In a first example, the distributed storage 130 may be configured to store data in a way that ensures availability of data in case of a "fault" occurring at a given node. In a second example, the distributed storage 130 may be configured to store data in a way that allows requests for data to be processed in parallel on multiple nodes, instead of being limited to one.

In at least some embodiments of the present technology, the distributed storage 130 may host a distributed database for storing data in a structured manner over the plurality of servers 450. It is contemplated that the distributed database may be partitioned and/or sharded and stored in a distributed manner over the plurality of servers 450.

In some cases, the distributed storage 130 may perform replication techniques for storing data at the more than one nodes. Broadly speaking, replication involves using specialized software that looks for changes in the distributed storage 130. Once the changes have been identified, the replication process makes all the nodes, in a sense, "look the same". The replication process can be complex, time-consuming, and depends on inter alia the size of the distributed storage 130. This process can also require considerable processing resources. In other cases, the distributed storage 130 may perform duplication techniques for storing data at the more than one nodes. Broadly speaking, the distributed storage 130 may elect one node as a master and then duplicates that node. It should be noted that replication and duplication techniques may allow the data to be current on each node of the distributed storage 130.

Nevertheless, other techniques may be used by the distributed storage 130 for storing data on the more than one nodes thereof. The implementation of these techniques may depend on inter alia the needs of the business and the sensitivity/confidentiality of the data stored in the distributed storage 130 and the price the business is willing to spend on ensuring data security, consistency and integrity.

In the context of the present technology, the server 112 is configured to store item embeddings associated with digital items in the distributed storage 130. For example, the server 112 may trigger a "storing process" of a given (or more than one) item embedding in the distributed storage 130, and which can be considered as completed when the given item embedding is stored on each one of the more than one nodes of the distributed storage 130. In other words, the distributed storage 130 may require some amount of time to store the given item embedding on each node after the server 112 has triggered the storing process.

In the above example, it should be noted that if the server 112 requests from the distributed storage 130 the given item embedding at a moment in time before the completion of the storing process, the server 112 may or may not be able to retrieve the given item embedding—whether or not the server 112 is able to retrieve the given item embedding depends on inter alia which node of the distributed storage 130 receives the request. To better illustrate this, let it be assumed that at the moment in time when the server 112 requests the given item embedding to the distributed storage 130 (before the completion of the storing process), the given item embedding has been stored on a first node of the more than one nodes but not yet stored on a second node of the more one nodes. In such a case, if the request is received by the first node, the server 112 may be able to retrieve the given item embedding. However, if the request is received by the second node, the server 112 may not be able to retrieve the given item embedding from the distributed storage 130.

In another example, the server 112 may trigger a storing process of an (or more than one) updated item embedding for a given digital item in the distributed storage 130. Similarly, for the storing process to be completed, the updated item embedding may need to be stored, as a replacement of an outdated item embedding (for example by overwriting/replacing the outdated item embedding), on each one of the more than one nodes of the distributed storage 130. In this example, if the server 112 requests an item embedding associated with the given item at a moment in time before the storing process of the updated item embedding has been completed, the server 112 may retrieve different versions of the item embedding for the given item depending on inter alia which node of the distributed storage 130 receives the said request. To better illustrate this, let it be assumed that at the moment in time when the server 112 requests an item embedding associated with the given item from the distributed storage 130, the updated item embedding has been stored on a first node of the more than one nodes instead of the outdated item embedding, but not yet stored on a second node of the more one nodes—that is, the second node is still storing the outdated item embedding. In such a case, if the request is received by the first node, the server 112 may retrieve the updated item embedding for the given item; however, if the request is received by the second node, the server 112 may retrieve the outdated item embedding for the given item from the distributed storage 130.

As alluded to above, the process of storing data in the distributed storage 130 requires substantially less time than the process of storing data in the non-distributed storage 170. For example, in order for the storing process to be completed in the non-distributed storage 170, a larger number of (user) embeddings may need to be stored if compared to a number of (item) embeddings to be stored in the distributed storage 130.

It should be noted that when the server 112 requests a user embedding for a given user from the non-distributed storage 170 and an item embedding for a given item from the distributed storage 130, it is desirable to retrieve embeddings of a same version. The developers of the present technology have realized that by employing conventional storage methods, if the request for the item embedding is sent by the server 112 before the storing process of the updated item embedding has been completed by the distributed storage 130, there may not be a guarantee that the version of the retrieved item embedding will match the latest version of the user embedding retrieved from the non-distributed storage 170.

As it will become apparent from the description herein further below, developers of the present technology have devised methods and systems for storing user embeddings in the non-distributed storage 170 and item embeddings in the distributed storage 130 in a manner ensuring that (i) the version of the user embedding retrieved by the server 112 from the non-distributed storage 170 matches (ii) the version of the item embedding retrieved by the server 112 from the distributed storage 130, and that, irrespective of whether the storing process of the updated item embedding has been completed at the time of the retrieval operation.

Figure 5:
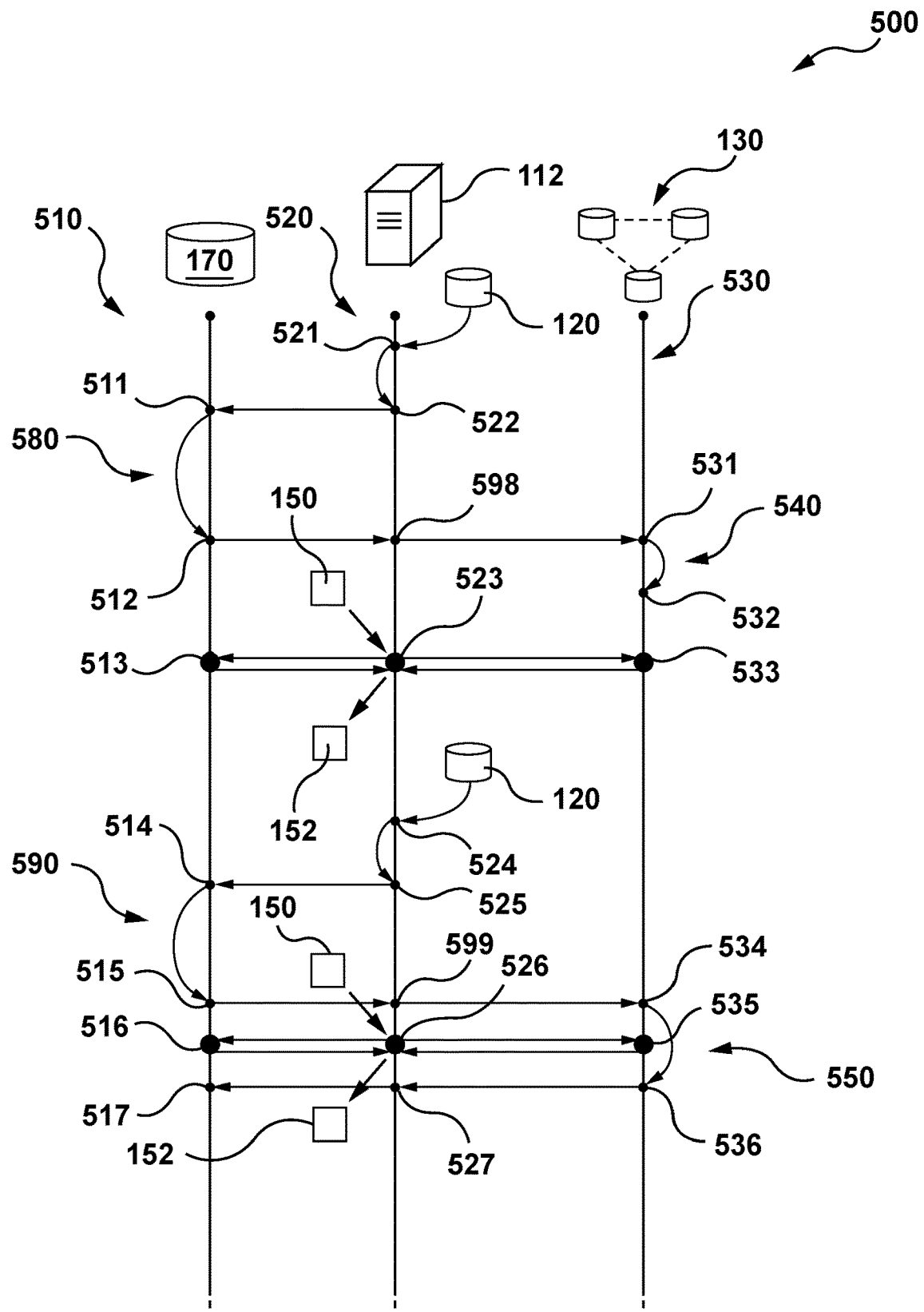
FIG. 5 depicts a timeline representation of events occurring at the server, the distributed storage and the non-distributed storage of FIG. 1, in accordance with non-limiting embodiments of the present technology.

To better illustrate this, reference will now be made to FIG. 5 depicting a timeline representation 500 of server-side events, distributed storage-side events, and non-distributed storage-side events. For example, non-distributed storage-side events are illustrated on a first timeline 510 corresponding to a timeline of events of the non-distributed storage 170, the server-side events are illustrated on a second timeline 520 corresponding to a timeline of events of the server 112, and the distributed storage-side events are illustrated on a third timeline corresponding to a timeline of events of the distributed storage 130.

As illustrated by an event 521, the server 112 is configured to retrieve from the recommendation storage 120 the latest user-item interaction data available at that moment in time. For example, the server 112 may be configured to access the recommendation storage 120 at the moment in time 201 (see FIG. 2) and, as a result, may retrieve the user-item interaction data 211.

The server 112 may be configured to retrieve the user-item interaction data 211 at the moment in time 201 for training the matrix factorization model 160. For example, the server 112 may be configured to perform a first training phase of the matrix factorization model 160 based on the retrieved user-item interaction data 211 and generate first user embeddings and first item embeddings (first versions thereof). The server 112 may also be configured to associate the first user embeddings and the first item embeddings with a first version value indicative of that the first user embeddings and the first item embeddings have been generated during a first in-use iteration of the matrix factorization model 160, but also indicative of that the first user embeddings and the first item embeddings have been generated during a common in-use iteration and are therefore of a same version.

The server 112 generating the first user embeddings and the first item embeddings and associating them with the first version value is illustrated via an event 522. The server 112 may be configured to transmit data indicative of the first user embeddings and respectively associated first values to the non-distributed storage 170 for storage. The receipt of the data indicative of the first user embeddings and the respectively associated first values by the non-distributed storage 170 is illustrated via event 511.

It is contemplated that the transmission of data by the server 112 may trigger a storing process 580 by the non-distributed storage 170. The completion of the storing process 580 of the first user embeddings and the respectively associated first values by the non-distributed storage 170 is illustrated via event 512.

Once the storing process 580 is completed, the server 112 may be configured to acquire an indication thereof from the non-distributed storage 170. The acquisition of the indication is illustrated via event 598. In response, the server 112 may be configured to transmit data indicative of the first item embeddings and respectively associated first values to the distributed storage 130 for storage. The receipt of the data indicative of the first item embeddings and the respectively associated first values by the distributed storage 130 is illustrated via event 531.

It is contemplated that the transmission of data by the server 112 may trigger a storing process 540 by the distributed database 130. The completion of the storing process 540 of the first item embeddings and the respectively associated first values by the distributed storage 130 is illustrated via event 532. It should be noted that the amount of time between the events 531 and 532 is substantially shorter to the amount of time between the events 511 and 512—as explained above, this is due to the fact that a larger number of user embeddings are to be stored via the storing process 580 if compared to a number of item embeddings that are to be stored via the storing process 540.

For the sake of illustration, let it be assumed that a request for content recommendation (for example, the request 150) is received by the server 112 and which triggers a content recommendation procedure by the server 112. The server 112 executing the first content recommendation procedure is illustrated via event 523. During the content recommendation procedure, the server 112 is configured to execute the decision-tree based MLA 140 for ranking one or more items for the user 102 based on their estimated relevance thereto. As previously alluded to, the server 112 may be configured to retrieve a user embedding associated with the user 102, and one or more item embeddings respectively associated with one or more items to be ranked by the MLA 140.

During the content recommendation procedure (during the online mode), the server 112 may be configured to send a request to the distributed storage 130 for retrieving the one or more item embeddings respectively associated with the one or more digital items to be ranked. In response to the request from the server 112, the distributed storage 130 may be configured to identify and provide the one or more item embeddings respectively associated with items to be ranked to the server 112. The identification and provision of the one or more item embeddings is illustrated via event 533.

As seen on FIG. 5, the event 533 occurs after the event 532, and therefore after the storing process 540 of the first item embeddings and the respectively associated first values has been completed by the distributed storage 130. Due to the timing of the event 533 occurring after the event 532, the server 112 will retrieve the first item embeddings associated with the first values, irrespective of which of the more than one nodes of the distributed storage 130 receives the request.

During the content recommendation procedure (during online mode), the server 112 may be configured to send a request to the non-distributed storage 170 for retrieving the user embedding of a given user associated with the content recommendation request (for example, the user 102). In response to the request from the server 112, the non-distributed storage 170 may be configured to identify and provide the user embedding associated with the user 102 to the server 112. The identification and provision of the user embedding is illustrated via event 513.

In order to identify the correct user embedding for retrieval, the server 112 may use a user ID associated with the given user and the first value associated with the retrieved one or more item embeddings—that is, the server 112 may use the user ID to make sure that the user embedding being retrieved is associated with the correct user, and may use the first value to make sure that the user embedding being retrieved for that user is of a same, correct version as the retrieved one or more item embeddings. In this example, at the moment in time corresponding to the event 513, the non-distributed storage 170 is storing only one version of user embedding for the given user. However, as it will now be described in greater details, at other moments in time, the non-distributed storage 170 may store more than one version of user embedding for the given user and therefore, the server 112 may use a version value associated with the retrieved one or more item embeddings for selecting the user embedding of a correct version.

Continuing with the example of FIG. 5, as illustrated via event 524, the server 112 may be configured to retrieve from the recommendation storage 120 the latest user-item interaction data available at that moment in time. For example, the server 112 may be configured to access the recommendation storage 120 at the moment in time 202 (see FIG. 2) and, as a result, may retrieve the user-item interaction data 212.

The server 112 may be configured to retrieve the user-item interaction data 212 at the moment in time corresponding to the event 524 for (re-)training and/or updating the matrix factorization model 160. For example, the server 112 may be configured to perform a second training phase of the matrix factorization model 160 based on the retrieved user-item interaction data 212 and generate second user embeddings and second item embeddings (second version thereof). The server 112 may also be configured to associate the second user embeddings and the second item embeddings with a second version value indicative of that the second user embeddings and the second item embeddings have been generated during a second in-use iteration of the matrix factorization model 160, but also indicative of that the second user embeddings and the second item embeddings have been generated during a common in-use iteration and are therefore of a same version.

The server 112 generating the second user embeddings and the second item embeddings and associating them with the second version value is illustrated via an event 525. The server 112 may be configured to transmit data indicative of the second user embeddings and respectively associated second values to the non-distributed storage 170 for storage. The receipt of the data indicative of the second user embeddings and the respectively associated second values by the non-distributed storage 170 is illustrated via event 514.

It is contemplated that the transmission of data by the server 112 may trigger a storing process 590 by the non-distributed storage 170. The completion of the storing process 590 of the second user embeddings and the respectively associated second values by the non-distributes storage 170 is illustrated via event 515.

It should be noted that the server 112 is configured to store the second user embeddings and the respectively associated second values in the non-distributed storage 170 in addition to the first user embeddings and the respectively associated first values. For example, this may correspond to the non-limiting example illustrated on FIG. 3, where the first user embedding 360 associated with the first value 362 and the second user embedding 370 associated with the second value 372 are stored together, in addition to one another, in the non-distributed storage 170 in association with the user 302.

Once the storing process 590 is completed, the server 112 may be configured to receive an indication thereof and which is illustrated via event 599. In response, the server 112 may be configured to transmit data indicative of the second item embeddings and respectively associated second values to the distributed storage 130 for storage. The receipt of the data indicative of the second item embeddings and the respectively associated second values by the distributed storage 130 is illustrated via event 534.

It is contemplated that the transmission of data by the server 112 may trigger a storing process 550 by the distributed storage 130. The completion of a storing process 550 of the second item embeddings and the respectively associated second values by the distributed storage 130 is illustrated via event 536. It should be noted that the amount of time between the events 534 and 536 is substantially shorter to the amount of time between the events 514 and 515. In one non-limiting implementation of the present technology, it is contemplated that the storing process 590 by the non-distributed storage 170 may take about 4 hours, whereas the storing process 550 by the distributed storage 130 may take about 1 hour.

However, in contrast to the storing process 590 of second user embeddings and the respectively associated second values by the distributed storage 130, the server 112 is configured to store the second item embeddings and the respectively associated second values in the distributed storage 130 by replacing/overwriting the respective first item embeddings and the respectively associated first values. This means that, during the storing process 550, the server 112 is configured to store, for a respective item, a given second (updated) item embedding and a respectively associated second value by replacing/overwriting a corresponding first (now outdated) item embedding and a respectively associated first value.

However, for the storing process 550 to be completed, the first (now outdated) item embedding and a respectively associated first value for the given item needs to be replaced/overwritten on each one of the more than one nodes of the distributed storage 130. Therefore, if a request for an item embedding associated with the given item is received before the storing process 550 is completed, the version of the item embedding that is retrieved for that item may depend on which of the nodes has received the request.

To better illustrate this, let it be assumed that an other request for content recommendation is received by the server 112 and which triggers a second content recommendation procedure by the server 112. The server 112 executing the second content recommendation procedure is illustrated via event 526. During the second content recommendation procedure, the server 112 is configured to execute the decision tree-based MLA 140 for ranking one or more items for the user 102 based on their estimated relevance thereto.

As previously alluded to, the server 112 may be configured to retrieve a user embedding associated with the user 102, and one or more item embeddings respectively associated with one or more items to be ranked by the MLA 140.

Figure 6:
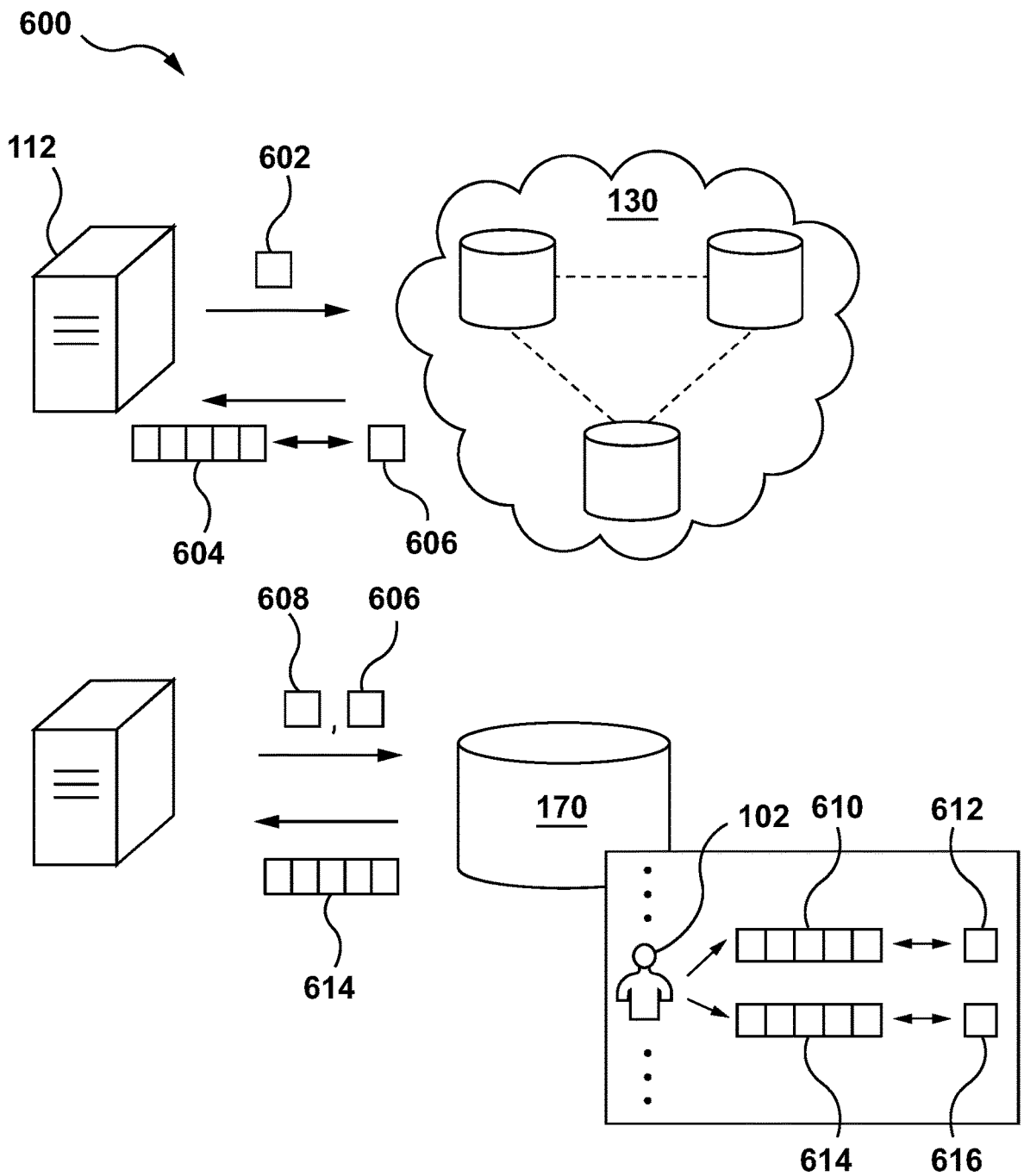
FIG. 6 depicts a representation of how the server of FIG. 1 is configured to access the distributed and the non-distributed storages of the system of FIG. 1 for retrieving user and item embeddings, in accordance with non-limiting embodiments of the present technology.

During the second content recommendation procedure (during the online mode), the server 112 may be configured to send a request to the distributed storage 130 for retrieving the one or more item embeddings respectively associated with the one or more digital items to be ranked. Reference will now be made to FIG. 6 illustrating how the request may be transmitted by the server 112 to the distributed storage 130 and what information, in response thereto, may be retrieved by the server 112. The non-limiting example of FIG. 6 illustrates the retrieval process for one (single) digital item that is to be ranked amongst other items, however, it should be noted that the server 112 may be configured to perform a retrieval process for all items to be ranked in a similar manner.

The request from the server 112 to the distributed storage 130 may comprise data indicative of an item ID 602. The request is received by a given node amongst the more than one nodes of the distributed storage 130 and the item ID 602 is used for retrieving (i) an item embedding 604 associated with the item ID 602, and (ii) the respectively associated version value 606 and which are stored on the given node at the time of the request.

However, it should be noted that the second content recommendation procedure is occurring before the storing process 550 is completed, and as a result, the retrieved item embedding 604 may be associated with the first value (first version) or the second value (second version), depending on whether the first corresponding item embedding for the respective item has or has not been replaced/overwritten with the second corresponding item embedding on the given node at the time when the request is received by the given node. The identification and provision of the item embedding 604 and the respectively associated version value 606 is illustrated on FIG. 5 via event 535.

During the second content recommendation procedure (during the online mode), the server 112 may be configured to send a request to the non-distributed storage 170 for retrieving the user embedding of the user 102 associated with the content recommendation request. Returning to FIG. 6, there is depicted how the request may be transmitted by the server 112 to the non-distributed storage 170 and what information, in response thereto, may be retrieved by the server 112.

The request from the server 112 to the non-distributed storage 170 may comprise data indicative of a user ID 608 associated with the user 102 and the respectively associated version value 606 of the retrieved item embedding 604.

The server 112 may use the user ID 608 to identify user embeddings stored in association with the user 102 at the time of the request. As illustrated, the server 112 may identify that two user embeddings are stored in association with the user 102, namely a first user embedding 610 and a second user embedding 614. The first user embedding 610 is stored in association with a first value 612 indicative of that the first user embedding 610 is of a first version, and the second user embedding 614 is stored in association with the second value 616 indicative of that the second user embedding 614 is of a second version.

The server 112 may use the version value 606 of the retrieved item embedding 604 in order to select which one, amongst the first user embedding 610 and the second user embedding 614 is to be retrieved. It can be said that the server 112 may compare the version value 606 (i) against the first value 612 associated with the first user embedding 610 and (ii) against the second value 616 associated with the second user embedding 614 for verifying which one of the first user embedding 610 and the second user embedding 614 is of a same version as the retrieved item embedding 604.

Let it be assumed that the server 112 determines that the second value 616 matches the version value 606. In this case, the server 112 determines that the second user embedding 614 is of a same version as the retrieved item embedding 604. As a result, the server 112 retrieves the second user embedding 614 from the non-distributed storage 170. The identification and provision of the second user embedding 614 to the server 112 is illustrated via event 516 on FIG. 5. Therefore, during the second content recommendation procedure, the server 112 may be configured to generate a given feature for the given item associated with the item ID 602 for ranking purposes based on the retrieved item embedding 604 and the second user embedding 614 while ensuring that they are both of a same version.

Now let it be assumed that the server 112 determines that the first value 612 matches the version value 606. In this case, the server 112 determines that the first user embedding 610 is of a same version as the retrieved item embedding 604. As a result, the server 112 may retrieve the first user embedding 610 (instead of the second user embedding 614) from the non-distributed storage 170. In this example, during the second content recommendation procedure, the server 112 may be configured to generate a given feature for the given item associated with the item ID 602 for ranking purposes based on the retrieved item embedding 604 and the first user embedding 610 while ensuring that they are both of a same version.

In some embodiments of the present technology, the server 112 may be configured to monitor completion of the storing process 550 for triggering one or more action on data stored in the non-distributed storage 170. For example, once the storing process 550 is completed as illustrated via the event 536 on FIG. 5, the server 112 may receive an indication to that effect and, in response, trigger an action on data stored in the non-distributed storage 170. The server 112 triggering an action on data stored in the non-distributed storage 170 is illustrated via event 527.

In at least some embodiments of the present technology, in response to the storing process 550 being completed, the server 112 may trigger removal/deletion of first user embeddings stored in the non-distributed storage 170. It should be noted that when the storing process 550 is completed, each one of the nodes of the distributed storage 130 is storing exclusively the second item embeddings. The developers of the present technology have realized that, after the completion of the storing process 550, there is no longer the need to store first user embeddings because subsequent requests for item embeddings to the distributed storage 130 cannot return item embeddings of a first version.

The removal/deletion of first user embeddings stored in the non-distributed storage 170 is illustrated via event 517. Removal/deletion of obsolete data by the server 112 from the non-distributed storage 170 may allow reducing the amount of memory required from the non-distributed storage 170 for storing data indicative of user embeddings.

Figure 7:
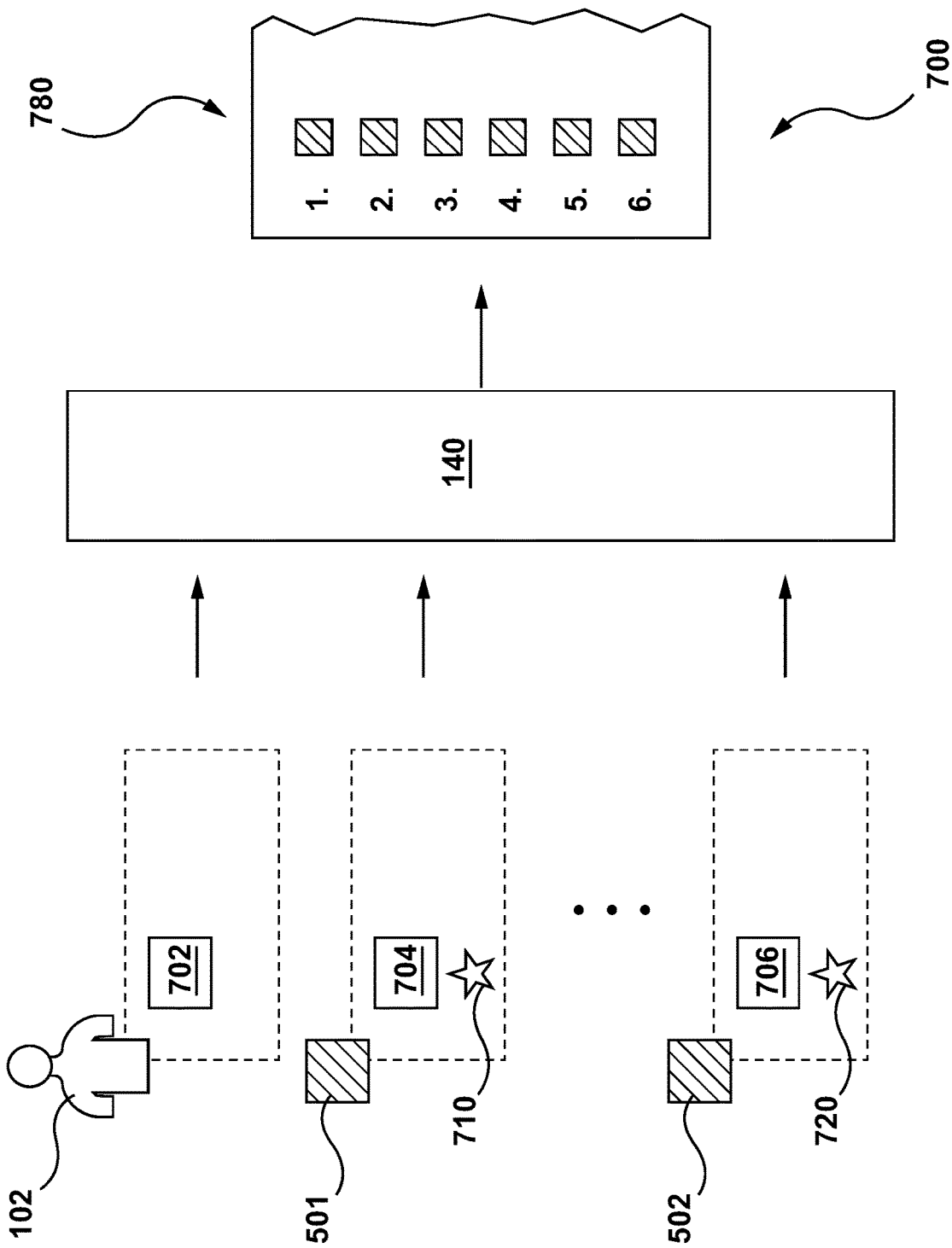
FIG. 7 depicts an in-use phase of a relevance estimation model for ranking in-use items, in accordance with non-limiting embodiments of the present technology.

As mentioned above, the server 112 may be configured to employ retrieved embeddings for generating features that are to be used for ranking items based on estimated relevance to the user 102. With reference to FIG. 7, there is depicted a representation 700 of how the server 112 is configured to employ the decision-tree based MLA 140 in order to generate a ranked list of items 780 for the user 102 during the second content recommendation procedure (see the event 526 on FIG. 5). As seen, the server 112 may input into the decision-tree based MLA 140 user feature data 702. For example, the server 112 may access the recommendation storage 120 and retrieve information associated with the user 102 and stored as part of the user data.

The server 112 may also input for a first item 501 item data 704 and a first feature 710. For example, the server 112 may be configured to access the recommendation storage 120 and retrieve information associated with the first item 501 and stored as part of the item data of the recommendation system 180. In some embodiments of the present technology, the server 112 may be configured to generate the first feature 710 as a combination of (i) an item embedding retrieved for the first item 501 from the distributed storage 130 and (ii) a user embedding retrieved for the user 102 from the non-distributed storage 170. The first feature 710 is a combination of an item embedding and a user embedding of a same version, as explained above.

The server 112 may be configured to generate the first feature 710 for the first item 501 as a product of the two retrieved embeddings. In some embodiments, the server 112 may be configured to compute the product as a dot product of the two retrieved embeddings. In other embodiments, the product may be representative of a Euclidian distance between the two retrieved embeddings. In further embodiments, it can be said that the result of the product (i.e., a given feature) is indicative of how similar, or how dissimilar, the two retrieved embeddings are to one another.

The server 112 may also input for a second item 502 item data 706 and a second feature 720. For example, the server 112 may be configured to access the recommendation storage 120 and retrieve information associated with the second item 502 and stored as part of the item data of the recommendation system 180. The server 112 may be configured to generate the second feature 720 for "the user 102—second item 502" pair similarly to how the server 112 is configured to generate the first feature 710 for "the user 102—first item 501" pair. It should be noted that although the pair of embeddings retrieved for generating the first feature 710 are of the same version, and the pair of embeddings retrieved for generating the second feature 720 are of the same version, in some embodiments of the present technology, the pair of embeddings retrieved for generating the first feature 710 and the pair of embeddings retrieved for generating the second feature 720 may or may not be of a same version. Whether or not the pair of embeddings retrieved for generating the first feature 710 and the pair of embeddings retrieved for generating the second feature 720 are of a same version may depend on a specific implementation of the present technology. The decision-tree based MLA 140 is configured to generate, as an output, the ranked list of recommendation items 780 that are ranked based on their relevance to the user 102.

In some embodiments of the present technology, the server 112 may be configured to use one or more items from the ranked list of recommendation items 780 as content recommendation for the user 102 during the second content recommendation procedure (see the event 526). For example, the server 112 may use at least some of the ranked list of recommendation items 780 for generating the recommended digital content set 814 depicted in FIG. 8. Indeed, the first recommended digital document 816 and the second recommended digital document 818 may include content of the first item 501 and the second item 502, respectively.

Figure 9:
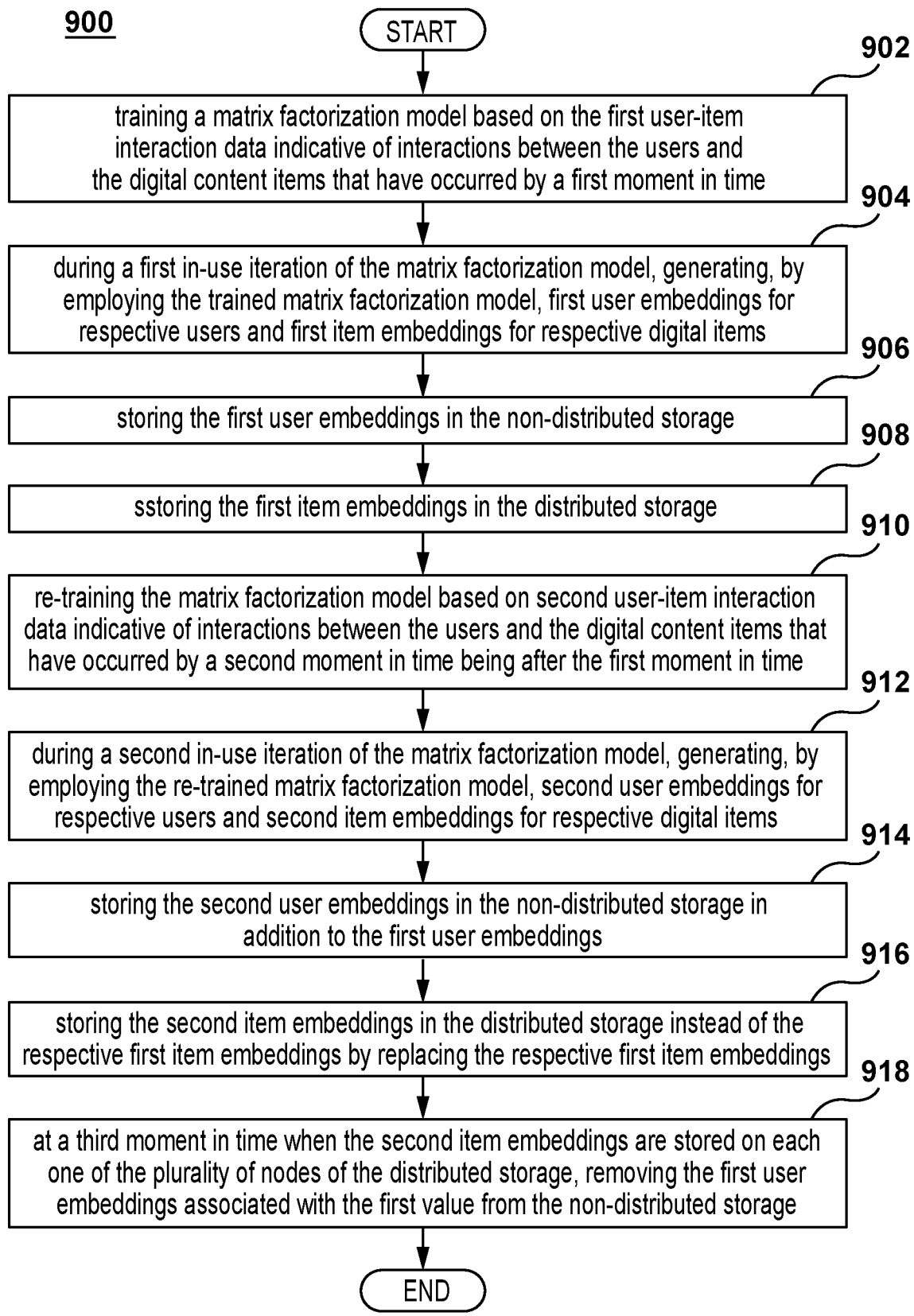
FIG. 9 depicts a block diagram of a method of storing data associated with users and items of a recommendation system of FIG. 1, the method executable by the server of FIG. 1, in accordance with embodiments of the present technology.

Turning now to FIG. 9, there is depicted a schematic block diagram depicting a flow chart of a method 900 of storing data associated with users and items of a recommendation system 180. Various steps of the method 900 will now be described in greater detail. It should be noted that in some embodiments, at least some of the steps of the method 900 may be omitted, replaced or additional steps may be executed to those listed below as part of the method 900, without departing from the scope of the present technology.

Step 902: Training a Matrix Factorization Model Based on First User-Item Interaction Data Indicative of Interactions Between the Users and the Digital Content Items that have Occurred by a First Moment in Time The method 900 begins at step 902 with the server 112 configured to training the matrix factorization model 160 based on first user-item interaction data indicative of interactions between users and items of the recommendation system 180 that have occurred by a first moment in time. For example, as illustrated by the event 521 (see FIG. 5), the server 112 may be configured to retrieve from the recommendation storage 120 the latest user-item interaction data available at that moment in time. For example, the server 112 may be configured to access the recommendation storage 120 at the moment in time 201 (see FIG. 2) and, as a result, may retrieve the user-item interaction data 211.

The server 112 may be configured to retrieve the user-item interaction data 211 at the moment in time 201 for training the matrix factorization model 160. For example, the server 112 may be configured to perform a first training phase of the matrix factorization model 160 based on the retrieved user-item interaction data 211. In some embodiments, the matrix factorization model 160 may be a Singular Value Decomposition (SVD) based model.

Step 904: During a First In-Use Iteration of the Matrix Factorization Model, Generating, by Employing the Trained Matrix Factorization Model, First User Embeddings for Respective Users and First Item Embeddings for Respective Digital Items The method 900 continues to step 904 with the server 112 configured to, during a first in-use iteration of the matrix factorization model 160, generate first user embeddings for respective users and first item embeddings for respective digital items (first versions thereof). The server 112 may also be configured to associate the first user embeddings and the first item embeddings with a first version value indicative of that the first user embeddings and the first item embeddings have been generated during a first in-use iteration of the matrix factorization model 160, but also indicative of that the first user embeddings and the first item embeddings have been generated during a common in-use iteration and are therefore of a same version.

Step 906: Storing the First User Embeddings in the Non-Distributed Storage

The method 900 continues to step 906 with the server 112 configured to store the first user embeddings in the non-distributed storage 170. The first user embeddings are stored in association with a first value and the first value is indicative of the first in-use iteration of the matrix factorization model 160.

It is also contemplated that the non-distributed storage 170 may be a K-value storage. Additionally or alternatively, the non-distributed storage 170 may be implemented as a single physical storage device.

It is contemplated that the transmission of data by the server 112 may trigger a storing process 580 by the non-distributed storage 170. The completion of the storing process 580 of the first user embeddings and the respectively associated first values by the non-distributed storage 170 is illustrated via event 512.

Once the storing process 580 is completed, the server 112 may be configured to acquire an indication thereof from the non-distributed storage 170. The acquisition of the indication is illustrated via event 598. In response, the server 112 may be configured to transmit data indicative of the first item embeddings and respectively associated first values to the distributed storage 130 for storage. The receipt of the data indicative of the first item embeddings and the respectively associated first values by the distributed storage 130 is illustrated via event 531.

Step 908: Storing the First Item Embeddings in the Distributed Storage

The method 900 continues to step 908 with the server 112 configured to store the first item embeddings in the distributed storage 130. The first item embeddings are stored in associated with the first value. The first item embeddings and the first user embeddings being stored in association with the first value is indicative of the first item embeddings and the first user embeddings have been generated during a common in-use iteration of the matrix factorization model 160.

It is contemplated that the transmission of data by the server 112 may trigger a storing process 540 by the distributed storage 130. The completion of the storing process 540 of the first item embeddings and the respectively associated first values by the distributed storage 130 is illustrated via event 532 (see FIG. 5). It should be noted that the amount of time between the events 531 and 532 is substantially shorter to the amount of time between the events 511 and 512—as explained above, this is due to the fact that a larger number of user embeddings are to be stored via the storing process 580 if compared to a number of item embeddings that are to be stored via the storing process 540.

Step 910: Re-Training the Matrix Factorization Model Based on Second User-Item Interaction Data Indicative of Interactions Between the Users and the Digital Content Items that have Occurred by a Second Moment in Time being after the First Moment in Time The method 900 continues to step 910 with the server 112 configured to re-train the matrix factorization model 160 based on second user-item interaction data indicative of interactions between the users and the digital content items that have occurred by a second moment in time being after the first moment in time. The matrix factorization model is re-trained to predict user-item interaction data missing at the second moment in time.

For example, as illustrated via the event 524, the server 112 may be configured to retrieve from the recommendation storage 120 the latest user-item interaction data available at that moment in time. For example, the server 112 may be configured to access the recommendation storage 120 at the moment in time 202 (see FIG. 2) and, as a result, may retrieve the user-item interaction data 212. The server 112 may be configured to retrieve the user-item interaction data 212 at the moment in time corresponding to the event 524 for (re-)training and/or updating the matrix factorization model 160.

Step 912: During a Second In-Use Iteration of the Matrix Factorization Model, Generating, by Employing the Re-Trained Matrix Factorization Model, Second User Embeddings for Respective Users and Second Item Embeddings for Respective Digital Items The method 900 continues to step 912 with the server 112 configured to, during a second in-use iteration of the matrix factorization model 160, generate, by the server employing the (re-trained) matrix factorization model 160, second user embeddings for respective users and second item embeddings for respective digital items. The second user embeddings and the second item embeddings are an output of the re-trained matrix factorization model 160. For example, the server 112 generating the second user embeddings and the second item embeddings and associating them with the second version value is illustrated via the event 525.

Step 914: Storing the Second User Embeddings in the Non-Distributed Storage in Addition to the First User Embeddings The method 900 continues to step 914 with the server 112 configured to store the second user embeddings in the non-distributed storage 170 in addition to the first user embeddings. The second user embeddings are stored in association with a second value, and the second value is indicative of the second in-use iteration of the matrix factorization model 160.

It is contemplated that the transmission of data by the server 112 may trigger the storing process 590 by the non-distributed storage 170. The completion of the storing process 590 of the second user embeddings and the respectively associated second values by the non-distributes storage 170 is illustrated via the event 515.

It should be noted that the server 112 may configured to store the second user embeddings and the respectively associated second values in the non-distributed storage 170 in addition to the first user embeddings and the respectively associated first values. For example, this may correspond to the non-limiting example illustrated on FIG. 3, where the first user embedding 360 associated with the first value 362 and the second user embedding 370 associated with the second value 372 are stored together, in addition to one another, in the non-distributed storage 170 in association with the user 302. Once the storing process 590 is completed, the server 112 may be configured to receive an indication thereof and which is illustrated via event 599.

Step 916: Storing the Second Item Embeddings in the Distributed Storage Instead of the Respective First Item Embeddings by Replacing the Respective First Item Embeddings The method 900 continues to step 916 with the server 112 configured to store the second item embeddings in the distributed storage 130 instead of the respective first item embeddings by replacing the respective first item embeddings. The second item embeddings are stored in association with the second value. It should be noted that the second item embeddings and the second user embeddings being stored in association with the second value is indicative of the second item embeddings and the second user embeddings have been generated during a common in-use iteration of the matrix factorization model 160.

It is contemplated that the transmission of data by the server 112 may trigger the storing process 550 by the distributed storage 130. The completion of the storing process 550 of the second item embeddings and the respectively associated second values by the distributed storage 130 is illustrated via the event 536. It should be noted that the amount of time between the events 534 and 536 is substantially shorter to the amount of time between the events 514 and 515. In one non-limiting implementation of the present technology, it is contemplated that the storing process 590 by the non-distributed storage 170 may take about 4 hours, whereas the storing process 550 by the distributed storage 130 may take about 1 hour.

However, in contrast to the storing process 590 of second user embeddings and the respectively associated second values by the distributed storage 130, the server 112 is configured to store the second item embeddings and the respectively associated second values in the distributed storage 130 by replacing/overwriting the respective first item embeddings and the respectively associated first values. This means that, during the storing process 550, the server 112 is configured to store, for a respective item, a given second (updated) item embedding and a respectively associated second value by replacing/overwriting a corresponding first (now outdated) item embedding and a respectively associated first value.

However, for the storing process 550 to be completed, the first (now outdated) item embedding and a respectively associated first value for the given item needs to be replaced/overwritten on each one of the more than one nodes of the distributed storage 130. Therefore, if a request for an item embedding associated with the given item is received before the storing process 550 is completed, the version of the item embedding that is retrieved for that item may depend on which of the nodes has received the request.

In at least some embodiments of the present technology, it can be said that the storing the second user embeddings may be performed in a first amount of time, and the storing the second item embeddings may be performed in a second amount of time, and where the second amount of time being substantially shorter than the first amount of time.

In some embodiments, the first amount of time may be defined by (i) a moment in time when the server 112 begins the storing of the second user embeddings in the non-distributed storage 170 (the event 514) and (ii) a moment in time when the server 112 ends the storing of the second user embeddings in the non-distributed storage 170 (the event 515), and where the second amount of time is defined by (i) a moment in time when the server 112 begins the storing of the second item embeddings in the distributed storage 130 (the event 534), and (ii) the third moment in time when the server 112 ends the storing of the second item embeddings (the event 536).

Step 918: At a Third Moment in Time when the Second Item Embeddings are Stored on Each One of the Plurality of Nodes of the Distributed Storage, Removing the First User Embeddings Associated with the First Value from the Non-Distributed Storage The method 900 continues to step 918 with the server 112 configured to, at a third moment in time when the second item embeddings are stored on each one of the plurality of nodes of the distributed storage 130, remove the first user embeddings associated with the first value from the non-distributed storage 170, such that the second user embeddings are stored in the non-distributed storage 170 at the third moment in time, instead of both the first user embeddings and the second user embeddings.

In some embodiments, the server 112 may be configured to monitor the storing process 550 of the second item embeddings in the distributed storage 130. In some embodiments, the server 112 may be configured to monitor the storing process 590 of the second user embeddings in the non-distributed storage 170.

In other embodiments, the server 112 may be configured to determine the third moment in time when the second item embeddings are stored on the each one of the plurality of nodes of the distributed storage 130.

In further embodiments, the server 112 may further be configured to receiving, from the distributed storage 130, a confirmation of fault-tolerant storage of the second item embeddings. The third moment in time may correspond to a moment in time when the confirmation is received by the server 112. For example, the receipt of the confirmation by server 112 may correspond to the event 527.

In some embodiments of the present technology, the server 112 may further be configured to, at a fourth moment in time, between the second moment in time and the third moment in time, receive, by the server, an indication of request 150 for content recommendation for the electronic device 104 associated with the user 102.

For example, let it be assumed that request for content recommendation is received by the server 112 and which triggers a second content recommendation procedure by the server 112. The server 112 executing the second content recommendation procedure is illustrated via the event 526. During the second content recommendation procedure, the server 112 is configured to execute the decision tree-based MLA 140 for ranking one or more items for the user 102 based on their estimated relevance thereto. As previously alluded to, the server 112 may be configured to retrieve a user embedding associated with the user 102, and one or more item embeddings respectively associated with one or more items to be ranked by the MLA 140.

During the second content recommendation procedure (during the online mode), the server 112 may be configured to send a request to the distributed storage 130 for retrieving the one or more item embeddings respectively associated with the one or more digital items to be ranked. It can be said that the server 112 may be configured to retrieve from the distributed storage 130 a target item embedding associated with a given digital item, and where the given digital item is a potentially recommendable item for the given user. The target item embedding is either a given first item embedding for the given item or a given second item embedding for the given item, and the given item embedding being associated with a target value being either the first value or the second value.

The server 112 may also be configured to select from the non-distributed storage 170 a target user embedding associated with the given user amongst (i) a first given user embedding associated with the given user and stored in association with the first value and (ii) a second given user embedding associated with the given user and stored in association with the second value. For example, the server 112 configured to select the target user embedding may be configured to determine whether the target value of the given item embedding matches the first value or the second value. If the target value matches the first value, the server 112 may select the first given user embedding as the target user embedding. If the target value matches the second value, the server 112 may select the second given user embedding. The server 112 may also be configured to generate a ranking feature as a combination of the target user embedding and the target item embedding, the ranking feature to be used for ranking the given item amongst other items for the given user.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of storing data associated with users of a recommendation system and digital items recommendable in the recommendation system, the recommendation system configured to provide digital items as content recommendation to the users of the recommendation system, the method executable by a server, the server being communicatively coupled with a non-distributed storage and a distributed storage, the distributed storage including a plurality of nodes, the method comprising:

training, by the server, a matrix factorization model based on first user-item interaction data indicative of interactions between the users and the digital content items that have occurred by a first moment in time, the matrix factorization model being trained to predict user-item interaction data missing at the first moment in time;

during a first in-use iteration of the matrix factorization model:

generating, by the server employing the trained matrix factorization model, first user embeddings for respective users and first item embeddings for respective digital items, the first user embeddings and the first item embeddings being an output of the trained matrix factorization model;

storing, by the server:

(i) the first user embeddings in the non-distributed storage, the first user embeddings being stored in association with a first value, the first value being indicative of the first in-use iteration of the matrix factorization model, and (ii) the first item embeddings in the distributed storage, the first item embeddings being stored in associated with the first value, the first item embeddings and the first user embeddings being stored in association with the first value being indicative of the first item embeddings and the first user embeddings being generated during a common in-use iteration of the matrix factorization model;

re-training, by the server, the matrix factorization model based on second user-item interaction data indicative of interactions between the users and the digital content items that have occurred by a second moment in time being after the first moment in time, the matrix factorization model being re-trained to predict user-item interaction data missing at the second moment in time;

during a second in-use iteration of the matrix factorization model:

generating, by the server employing the re-trained matrix factorization model, second user embeddings for respective users and second item embeddings for respective digital items, the second user embeddings and the second item embeddings being an output of the re-trained matrix factorization model;

storing, by the server:

(i) the second user embeddings in the non-distributed storage in addition to the first user embeddings, the second user embeddings being stored in association with a second value, the second value being indicative of the second in-use iteration of the matrix factorization model;

(ii) second item embeddings in the distributed storage instead of the respective first item embeddings by replacing the respective first item embeddings, the second item embeddings being stored in association with the second value, the second item embeddings and the second user embeddings being stored in association with the second value being indicative of the second item embeddings and the second user embeddings being generated during a common in-use iteration of the matrix factorization model;

at a third moment in time when the second item embeddings are stored on each one of the plurality of nodes of the distributed storage, removing, by the server, the first user embeddings associated with the first value from the non-distributed storage, such that the second user embeddings are stored in the non-distributed storage at the third moment in time, instead of both the first user embeddings and the second user embeddings.

2. The method of claim 1, wherein the method further comprises monitoring, by the server, a storing process of the second item embeddings in the distributed storage.

3. The method of claim 1, wherein the method further comprises determining, by the server, the third moment in time when the second item embeddings are stored on the each one of the plurality of nodes of the distributed storage.

4. The method of claim 3, wherein the method further comprises receiving, by the server from the distributed storage, a confirmation of fault-tolerant storage of the second item embeddings, the third moment in time corresponding to a moment in time when the confirmation is received by the server.

5. The method of claim 1, wherein the storing the second user embeddings is performed in a first amount of time, and wherein the storing the second item embeddings is performed in a second amount of time, the first amount of time being substantially shorter than the second amount of time.

6. The method of claim 5, wherein the first amount of time is defined by (i) a moment in time when the server begins the storing of the second user embeddings in the non-distributed storage and (ii) a moment in time when the server ends the storing of the second user embeddings in the non-distributed storage, and wherein the second amount of time is defined by (i) a moment in time when the server begins the storing of the second item embeddings in the distributed storage, and (ii) the third moment in time when the server ends the storing of the second item embeddings.

7. The method of claim 1, wherein the matrix factorization model is a Singular Value Decomposition (SVD) based model.

8. The method of claim 1, wherein the non-distributed storage is a K-value storage.

9. The method of claim 1, wherein the non-distributed storage is implemented as a single physical storage device.

10. The method of claim 1, wherein at a fourth moment in time, between the second moment in time and the third moment in time, the method further comprising:

receiving, by the server, an indication of request for content recommendation for an electronic device associated with a given user;

retrieving, by the server, from the distributed storage a target item embedding associated with a given digital item, the given digital item being a potentially recommendable item for the given user,
- the target item embedding being either a given first item embedding for the given item or a given second item embedding for the given item,
  - the given item embedding being associated with a target value being either the first value or the second value;

selecting, by the server, from the non-distributed storage a target user embedding associated with the given user amongst (i) a first given user embedding associated with the given user and stored in association with the first value and (ii) a second given user embedding associated with the given user and stored in association with the second value, the selecting comprises:
- determining, by the server, whether the target value of the given item embedding matches the first value or the second value,
  - if the target value matches the first value, selecting the first given user embedding as the target user embedding,
  - if the target value matches the second value, selecting the second given user embedding; and generating, by the server, a ranking feature as a combination of the target user embedding and the target item embedding, the ranking feature to be used for ranking the given item amongst other items for the given user.

11. A server for storing data associated with users of a recommendation system and digital items recommendable in the recommendation system, the recommendation system configured to provide digital items as content recommendation to the users of the recommendation system, the server being communicatively coupled with a non-distributed storage and a distributed storage, the distributed storage including a plurality of nodes, the server configured to:

train a matrix factorization model based on first user-item interaction data indicative of interactions between the users and the digital content items that have occurred by a first moment in time, the matrix factorization model being trained to predict user-item interaction data missing at the first moment in time;

during a first in-use iteration of the matrix factorization model:
- generate, by employing the trained matrix factorization model, first user embeddings for respective users and first item embeddings for respective digital items,
  - the first user embeddings and the first item embeddings being an output of the trained matrix factorization model;

store:
(i) the first user embeddings in the non-distributed storage, the first user embeddings being stored in association with a first value, the first value being indicative of the first in-use iteration of the matrix factorization model, and
(ii) the first item embeddings in the distributed storage, the first item embeddings being stored in associated with the first value,
- the first item embeddings and the first user embeddings being stored in association with the first value being indicative of the first item embeddings and the first user embeddings being generated during a common in-use iteration of the matrix factorization model;

re-train the matrix factorization model based on second user-item interaction data indicative of interactions between the users and the digital content items that have occurred by a second moment in time being after the first moment in time, the matrix factorization model being re-trained to predict user-item interaction data missing at the second moment in time;

during a second in-use iteration of the matrix factorization model:
- generate, by employing the re-trained matrix factorization model, second user embeddings for respective users and second item embeddings for respective digital items,
  - the second user embeddings and the second item embeddings being an output of the re-trained matrix factorization model;

store:
(i) the second user embeddings in the non-distributed storage in addition to the first user embeddings, the second user embeddings being stored in association with a second value, the second value being indicative of the second in-use iteration of the matrix factorization model;
(ii) second item embeddings in the distributed storage instead of the respective first item embeddings by replacing the respective first item embeddings, the second item embeddings being stored in association with the second value,
- the second item embeddings and the second user embeddings being stored in association with the second value being indicative of the second item embeddings and the second user embeddings being generated during a common in-use iteration of the matrix factorization model;

at a third moment in time when the second item embeddings are stored on each one of the plurality of nodes of the distributed storage, remove the first user embeddings associated with the first value from the non-distributed storage,
- such that the second user embeddings are stored in the non-distributed storage at the third moment in time, instead of both the first user embeddings and the second user embeddings.

12. The server of claim 11, wherein the server is further configured to monitor a storing process of the second item embeddings in the distributed storage.

13. The server of claim 11, wherein the server is further configured to determine the third moment in time when the second item embeddings are stored on the each one of the plurality of nodes of the distributed storage.

14. The server of claim 13, wherein the server is further configured to receive, from the distributed storage, a confirmation of fault-tolerant storage of the second item embeddings, the third moment in time corresponding to a moment in time when the confirmation is received by the server.

15. The server of claim 11, wherein the server configured to store the second user embeddings is performed in a first amount of time, and wherein the server configured to store the second item embeddings is performed in a second amount of time, the first amount of time being substantially shorter than the second amount of time.

16. The server of claim 15, wherein the first amount of time is defined by (i) a moment in time when the server begins the storing of the second user embeddings in the non-distributed storage and (ii) a moment in time when the server ends the storing of the second user embeddings in the non-distributed storage, and wherein the second amount of time is defined by (i) a moment in time when the server begins the storing of the second item embeddings in the distributed storage, and (ii) the third moment in time when the server ends the storing of the second item embeddings.

17. The server of claim 11, wherein the matrix factorization model is a Singular Value Decomposition (SVD) based model.

18. The server of claim 11, wherein the non-distributed storage is a K-value storage.

19. The server of claim 11, wherein the non-distributed storage is implemented as a single physical storage device.

20. The server of claim 11, wherein at a fourth moment in time, between the second moment in time and the third moment in time, the server further configured to:
   receive an indication of request for content recommendation for an electronic device associated with a given user;
   retrieve from the distributed storage a target item embedding associated with a given digital item, the given digital item being a potentially recommendable item for the given user,
      the target item embedding being either a given first item embedding for the given item or a given second item embedding for the given item,
      the given item embedding being associated with a target value being either the first value or the second value;
   select from the non-distributed storage a target user embedding associated with the given user amongst (i) a first given user embedding associated with the given user and stored in association with the first value and (ii) a second given user embedding associated with the given user and stored in association with the second value, to select the server being configured to:
      determine whether the target value of the given item embedding matches the first value or the second value,
         if the target value matches the first value, selecting the first given user embedding as the target user embedding,
         if the target value matches the second value, selecting the second given user embedding; and
   generate a ranking feature as a combination of the target user embedding and the target item embedding, the ranking feature to be used for ranking the given item amongst other items for the given user.

\* \* \* \* \*